(12) United States Patent
Watanabe

(10) Patent No.: US 7,356,226 B2
(45) Date of Patent: Apr. 8, 2008

(54) OPTICAL WAVEGUIDE COUPLER, SUB-ASSEMBLED OPTICAL UNIT, OPTICAL MODULE AND OPTICALLY COUPLING METHOD

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 22 days.

(21) Appl. No.: 11/390,397

(22) Filed: Mar. 28, 2006

(65) Prior Publication Data
US 2006/0222297 A1 Oct. 5, 2006

(30) Foreign Application Priority Data
Mar. 30, 2005 (JP) .............. 2005-098804

(51) Int. Cl.
*G02B 6/26* (2006.01)
*H04J 14/00* (2006.01)

(52) U.S. Cl. .......... 385/43; 385/14; 385/131; 385/132; 398/79; 398/85

(58) Field of Classification Search .......... 385/15, 385/43, 129, 130, 131, 132, 50, 14, 49; 398/79, 398/82, 84, 85
See application file for complete search history.

(56) References Cited

U.S. PATENT DOCUMENTS

| 5,629,999 | A | 5/1997 | Henery et al. ............ 385/43 |
| 6,684,011 | B2 * | 1/2004 | Jeong et al. ............ 385/43 |
| 6,775,454 | B2 * | 8/2004 | Itoh et al. ............ 385/129 |
| 6,937,799 | B2 * | 8/2005 | Matsushima et al. ......... 385/50 |
| 2004/0264863 | A1 | 12/2004 | Suzuki et al. ............ 385/43 |
| 2006/0222297 | A1 * | 10/2006 | Watanabe .............. 385/43 |

FOREIGN PATENT DOCUMENTS

| EP | 1 195 633 A2 | 4/2002 | ............. 385/43 X |
| EP | 1 555 551 A1 | 7/2005 | ............. 385/43 X |
| JP | 07-270839 | 10/1995 | ............. 385/43 X |
| JP | 8-262244 | 10/1996 | ............. 385/43 X |
| JP | 2003-43279 | 2/2003 | ............. 385/43 X |

OTHER PUBLICATIONS

Weissman, Z., et al., "Analysis of Periodically Segmented Waveguide Mode Expanders", Journal of Lightwave Technology, IEEE Service Center, New York, NY, US, vol. 13, No. 10, Oct. 1, 1995, pp. 2053-2058.
European Search Report dated Jul. 6, 2006.
Spuehler, Michael M., et al., "A Very Short Planar Silica Spot-Size Converter Using a Nonperiodic Segmented Waveguide", Journal of Lightwave Technology, IEEE Service Center, New York, NY, US, vol. 16, No. 9, Sep. 1998, pp. 1680-1685.

* cited by examiner

*Primary Examiner*—Brian M. Healy
(74) *Attorney, Agent, or Firm*—McGinn IP Law Group, PLLC

(57) ABSTRACT

An optical waveguide coupler for optically coupling an optical waveguide and an optical component having mutually different spot sizes, includes (1) a first spot size converting part, placed on the optical waveguide side, that converts a spot size with higher efficiency for an optical signal of a long wavelength band than for an optical signal of a short wavelength band, and (2) a second spot size converting part, placed on the optical component side, that converts a spot size with higher efficiency for the optical signal of the short wavelength band than for the optical signal of the long wavelength band.

40 Claims, 17 Drawing Sheets

OPTICAL WAVEGUIDE COUPLER, SUB-ASSEMBLED OPTICAL UNIT, OPTICAL MODULE AND OPTICALLY COUPLING METHOD

BACKGROUND OF THE INVENTION

1. Field of the Invention

The present invention relates to a technique for optically coupling an optical waveguide and an optical component, and particularly to an optical waveguide coupler, a sub-assembled optical unit, an optical module and an optically coupling method for optically coupling an optical waveguide and an optical component having mutually different spot sizes.

2. Description of the Related Art

More and more expectations have been placed on optical subscriber systems since FTTH (Fiber to the home) has become widespread in earnest. In particular, commercialization of GE-PON (Gigabit Ethernet®-Passive Optical Network) systems has been in rapid progress. In the GE-PON system, ONU (Optical Network Unit) and OLT (Optical Line Terminal) are used for sending/receiving optical signals. To these components, optical modules enabling bidirectional communication over a single cable of upstream signal 1.31 µM/downstream signal 1.49 µm are applied. These optical modules include "BiDi (Bi-Directional) modules" and "PLC (Planner Lightwave Circuit) modules. The "BiDi module" is prepared by combining micro-optics such as a LD (Laser Diode)/PD (Photo Diode), a filter and a lens. The "PLC module" is prepared by forming a silica waveguide on a silicon substrate and mounting the LD/PD and the like on the surface. For the former, an optical loss is low because of optical coupling by a lens, but active adjustment (alignment with the LD kept emitting light) is required. Therefore, production costs increase, and the production lead time gets longer. For the latter, passive alignment (alignment with the LD extinguished) by alignment using a silicon V groove and a marker is possible. Therefore, production costs are reduced, and the production lead time can be shortened. However, there is a problem that the PLC module tends to increase optical loss because of optical coupling via an optical waveguide.

Optical modules for ONU in the GE-PON system are required to be supplied in a constant number in the order of tens of thousands per month. Therefore, more and more expectations have been placed on the PLC module enabling production at a low cost and in a short time period. However, it has hitherto been difficult for the PLC module to have characteristics equivalent to those of the BiDi module as an optical module applied to the Ge-PON.

Thus, for improving the characteristics of the PLC module, a technique for optically coupling a LD and an optical waveguide, and an optical fiber and an optical waveguide with high efficiency is required. In particular, a coupling loss between the LD and the optical waveguide is very high, i.e. about several dB (e.g., 5 to 7 dB). This is a main factor which limits the characteristics. This is due to a large difference in spot size between the LD and the optical waveguide (spot size of LD<spot size of the optical waveguide). Accordingly, for reducing the coupling loss between the LD and the optical waveguide, it is necessary to enlarge the spot size of the LD or to reduce the spot size of the optical waveguide.

A SSC (Spot Size Converter) is known as a function for changing the spot size. For example, there is a LD with a SSC for increasing the spot size of the LD. However, this is expensive, and therefore unsuitable for application to an optical module intended for an optical subscriber system. It is therefore considered that reducing the spot size of the optical waveguide is a practical solution. For reducing the spot size of the optical waveguide, the core size of the optical waveguide may be reduced. However, if the core size decreases to a certain size or less, the spot size is enlarged. This results from a phenomenon in which light does not stay in the core but exudes to the clad side. If the core size is further reduced, light radiates and is no longer propagated in the core. Because there is such a limitation, a sufficient improvement of the characteristics cannot be achieved merely by reducing the core size. Thus, increasing a relative refractive index difference (Δn) of the optical waveguide so that light stays in the core has been under consideration (hereinafter such an optical waveguide is referred to as High Δ optical waveguide).

In a transceiver for bidirectional communication over a single cable, a port coupling the LD and the optical waveguide (LD port) and a port coupling the optical fiber and the optical waveguide (COM port) exist on the same flat surface of the same wafer. It is generally difficult to partially change a refractive index on the wafer flat surface. Thus, if Δn is increased for improving the coupling efficiency of the LD port, then Δn of the optical waveguide of the COM port also increases. In other words, if the spot size of the optical waveguide in the LD port is reduced, then the spot size of the optical waveguide in the COM port also decreases. Consequently, there is a problem that the coupling efficiency of the COM port decreases. Thus, the improvement of coupling efficiency in the LD port and the COM port is under a relationship of tradeoff.

Thus, a technique of performing trimming separately (e.g. applying UV exclusively to near the LD port) for partially increasing exclusively the refractive index of the LD port has been proposed. However, this results in a reduction in yield, and has a problem in terms of both the cost and production lead time.

For solving this problem, an optical coupling structure in which a High Δ optical waveguide and the optical fiber are coupled with high efficiency has been under consideration. For example, the "optical coupler" disclosed in Japanese Patent Laid-Open No. 2003-43279 (patent family US 2004/0264863) has a tapered waveguide (tapered SSC) for reducing a coupling loss between the optical waveguide and the optical fiber (SMF: Single mode fiber). This tapered waveguide has a waveguide width (core width) which decreases as the front end is approached from a predetermined starting point. This shape is intended for enlarging the spot size at a coupling part so that a radiation loss resulting from the mismatch of the spot size does not occur.

Specifically, such a taper (down taper) uses a phenomenon in which light is not fully confined to the inside of the waveguide, but instead, propagated while exuding to the periphery of the waveguide by reducing the waveguide width (core width) to a certain value or less. The down taper using exudation of light has a higher capability of enlarging the spot size than an up taper with an increased waveguide width. Further, structures using an exponential taper instead of a linear taper have been proposed. In this case, the spot size can be enlarged with a short propagation distance.

However, for enlarging the spot size by such a down taper, it is necessary to reduce the waveguide width to, for example, 1 µm or less. An additional problem is that characteristics are considerably changed with variations in the width by only about 10%. Moreover, another problem is that, because this structure uses confinement of light, its effect considerably varies depending on the wavelength. In the optical subscriber system, optical signals with wavelengths of 1.31 µm and 1.49 µm, or 1.55 µm in some cases, are used. In the transceiver for bidirectional communication over a single cable, a plurality of optical signals with these wavelengths pass through the same COM port, and therefore, the coupling loss with the optical fiber should be reduced at all of these wavelengths. Confinement of light is stronger on the shorter wavelength side (light of a shorter wavelength is more easily confined). Therefore, for allowing light of a short wavelength to exude, it is necessary to further reduce the waveguide width. However, once exudation of light begins, the spot size is abruptly enlarged. Therefore, if the waveguide width is reduced so that light of 1.31 µm exudes, light of 1.49 µm (or 1.55 µm) can no longer be coupled to the optical waveguide, and radiates to outside.

Thus, another proposal is, for example, the "waveguide taper" disclosed in Japanese Patent Laid-Open No. 8-262244 (patent family U.S. Pat. No. 5,629,999). This taper has a structure in which the optical waveguide is segmented along the direction of propagation of light. This periodically segmented waveguide (segmented SSC) uses a diffraction effect of light. In a gap at which the optical waveguide is segmented, light diffracts and the spot size is enlarged both longitudinally and laterally. Light tends to be coupled at the next optical waveguide and to maintain a plane wave (wave surface is prevented from becoming spherical).

The segmented SSC can be fabricated more easily than the tapered SSC, and its tolerance is not as strict. Therefore, the segmented SSC functions as an effective SSC in the High Δ optical waveguide by cleverly selecting a segmented period and duty-cycle (duty-cycle is a proportion of the waveguide length to the period). However, because a radiation loss occurs, the segmented SSC is inferior in coupling characteristic to the tapered SSC. In addition, it uses a diffraction effect of light, and therefore has a wavelength characteristic similar to that of the tapered SSC. The segmented SSC has a problem that decreases an effect as a SSC because the diffraction effect becomes lower as the wavelength becomes larger.

SUMMARY OF THE INVENTION

In view of the foregoing and other exemplary problems, drawbacks, and disadvantages of the related art methods and structures, an exemplary feature of the present invention is to provide an optical waveguide coupler, a sub-assembled optical unit, an optical module and an optically coupling method for efficiently optically coupling an optical waveguide and an optical component having mutually different spot sizes with respect to optical signals with a plurality of wavelength bands.

An optical waveguide coupler according to an exemplary aspect of the present invention for optically coupling an optical waveguide and an optical component having mutually different spot sizes, includes (1) a first spot size converting part, placed on the optical waveguide side, that converts a spot size with higher efficiency for an optical signal of a long wavelength band than for an optical signal of a short wavelength band, and (2) a second spot size converting part, placed on the optical component side, that converts a spot size with higher efficiency for the optical signal of the short wavelength band than for the optical signal of the long wavelength band.

A sub-assembled optical unit according to an exemplary aspect of the present invention with a waveguide and an optical component optically coupled, includes (1) a waveguide, (2) an optical component having a spot size different from that of the waveguide, and (3) the optical waveguide coupler mentioned above at a position of coupling of the waveguide and the optical component.

An optical module according to an exemplary aspect of the present invention with a waveguide and an optical component optically coupled, includes (1) the sub-assembled optical unit mentioned above, (2) a control unit controlling light transmitted by the LD in the sub-assembled optical unit and processing light received by the PD, (3) a package storing the sub-assembled optical unit and the control unit, and (4) a group of terminals supplying electric power to the sub-assembled optical unit and the control unit and taking out electric signals from these units.

An optically coupling method according to the present invention of optically coupling a waveguide and an optical component having mutually different spot sizes, includes (1) converting a spot size of an optical signal of a long wavelength band into a larger size than that of an optical signal of a short wavelength band by a first spot size converting part placed on the waveguide side, and (2) converting a spot size of the optical signal of the short wavelength band into a larger size than that of the optical signal of the long wavelength band by a second spot size converting part placed on the optical component side.

Thus, the optical waveguide coupler, the sub-assembled optical unit, the optical module and the optically coupling method have advantages of low dependency on the wavelength, a large production tolerance, and optically coupling an optical waveguide and an optical component having mutually different spot sizes with respect to optical signals with a plurality of wavelength bands with high efficiency.

BRIEF DESCRIPTION OF THE DRAWINGS

The exemplary aspects, features and advantages of the present invention will become more apparent from the following detailed description when taken in conjunction with the accompanying drawings wherein.

DETAILED DESCRIPTION OF THE EXEMPLARY ASPECTS

Exemplary aspects for carrying out the present invention will be described in detail below with reference to the drawings. The exemplary aspects described below show only illustrative examples in understanding the present invention, and the claims of the present invention are not limited to these exemplary aspects.

The present invention appropriately combines two types of SSCs (Spot Size Converters), and constructs a SSC having reduced dependency on the wavelength making use of conversion characteristics of their respective SSCs. More specifically, enlargement of a spot size of light of a long wavelength band (e.g. 1.55 µm) is achieved by a tapered SSC exhibiting a higher effect with a longer wavelength. Enlargement of a spot size of light of a short wavelength band (e.g. 1.31 µm) is achieved by a segmented SSC exhibiting a higher effect with a shorter wavelength.

Exemplary aspects of the present invention based on the aforementioned principle will be described in detail below.

Figure 1:
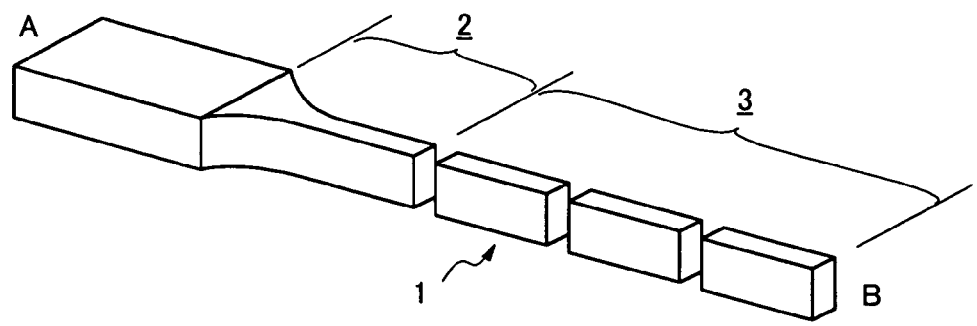
FIG. 1 shows a structure of an optical waveguide coupler according to an exemplary aspect of the present invention.

FIG. 1 shows a structure of an optical waveguide coupler according to an exemplary aspect of the present invention. The optical waveguide coupler 1 includes a first spot size converting part 2 and a second spot size converting part 3.

The first spot size converting part 2 can be a tapered waveguide using exudation of light resulting from reduction of the waveguide (core). The effect of confinement of light to the inside of the waveguide is higher for a shorter wavelength. Therefore, the effect of enlargement of the spot size by reduction of the waveguide width (core width) is higher for light of a longer wavelength. In other words, light of a shorter wavelength can be difficult to start exuding unless the waveguide width is reduced. Therefore, in the first spot size converting part 2, the spot size of light of a short wavelength band can be difficult to enlarge, while the spot size of light of a long wavelength band can be easily enlarged.

On the other hand, the second spot size converting part 3 can be a periodically segmented waveguide using a diffraction effect of light. The diffraction effect of light by the periodically segmented waveguide is higher for a shorter wavelength. Therefore, the effect of enlargement of the spot size by the diffraction effect is higher for light of a shorter wavelength. Accordingly, in the second spot size converting part 3, the spot size of light of a long wavelength band can be difficult to enlarge, while the spot size of light of a short wavelength band can be easily enlarged.

In this exemplary aspect, their advantages are utilized, and their disadvantages are complemented by utilizing respective features of these spot size converting parts. Specifically, the first spot size converting part 2 mainly enlarges the spot size of light of a long wavelength band, and the second spot size converting part 3 mainly enlarges the spot size of light of a short wavelength band.

In addition, the first spot size converting part 2 can be a linear taper (down taper). In another exemplary aspect, the first spot size converting part 2 can be, for example, an exponential taper as shown in FIG. 1 if, for example, it is desired to reduce the length of the taper. In this structure, the waveguide is not tapered at a constant rate, but is exponentially steeply tapered at the start of the taper. Applicants have recognized that exudation of light hardly occurs if the waveguide width is greater than a predetermined width, but if the waveguide width is a predetermined width or less, exudation of light abruptly increases as the waveguide width decreases. Thus, for a simple down taper, a radiation loss more easily occurs if the inclination of the taper is made steep. In contrast to this, in the exemplary case of the exponential taper, the length of the taper can be reduced by exponentially steeply tapering an area before exudation of the light occurs. Occurrence of a radiation loss can be inhibited by exponentially gently tapering an area after exudation of the light occurs. In other words, the exponential taper can be superior to the linear taper in that the length of the taper can be reduced, and the radiation loss can be easily reduced. Further, it can have an effect of reducing a propagation loss with a decrease in length of the taper.

The periodically segmented waveguide in the second spot size converting part 3 can be designed such that the length of a core is larger than the interval between cores (=gap length) for reducing the radiation loss. The waveguide width "Ws" of the periodically segmented waveguide is preferably almost equal to or slightly greater than that of the front end (taper end) of the first spot size converting part 2 for preventing an increase in coupling loss resulting from the mismatch of the spot size. For the arrangement of the periodically segmented waveguide, a constant period type (the arrangement period of waveguide blocks is constant), a constant gap type (the arrangement interval of waveguide blocks is constant) and the like can be applied.

For the material of the aforementioned optical waveguide, silica glass, lithium niobate (LN) and the like can be applied. In silica glass, the core for propagating light can be formed by doping germanium (Ge) and the like. In LN, the core for propagating light can be formed by diffusing titanium (Ti). Consequently, the core can have an increased refraction index and can confine light therein.

Figure 2:
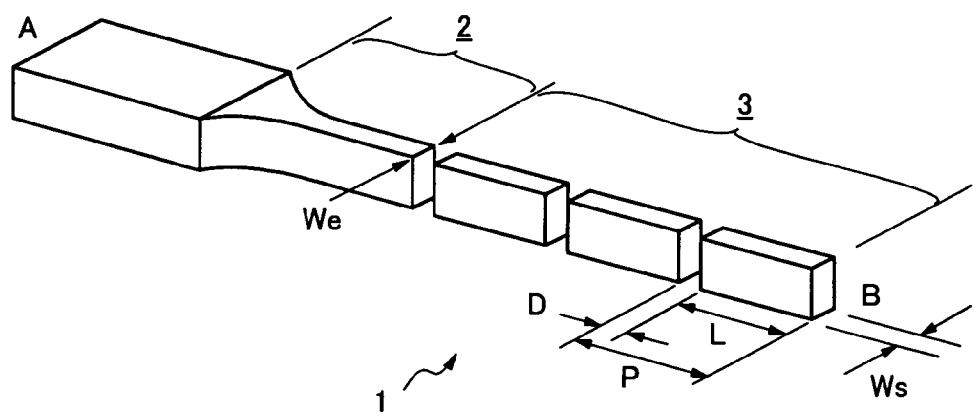
FIG. 2 exemplarily shows structural parameters of the optical waveguide coupler of FIG. 1.
Figure 3:
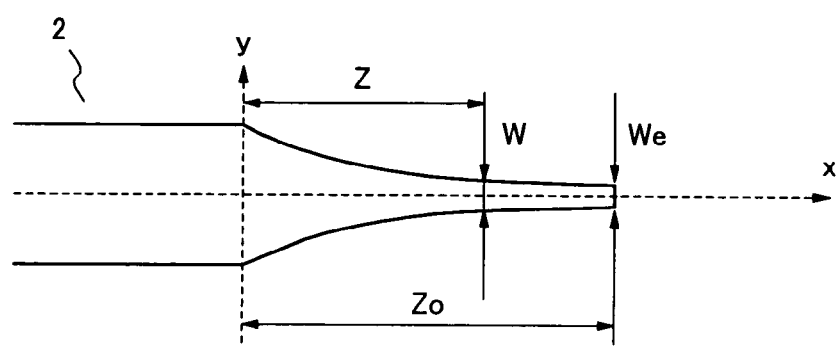
FIG. 3 exemplarily shows structural parameters of a first spot size converting part.

The dimension of each part of the exemplary optical waveguide coupler of FIG. 1 will now be exemplarily described with reference to FIGS. 2 and 3.

First, structural parameters (waveguide width, taper shape, taper length and the like) of the first spot size converting part 2 (tapered waveguide or tapered SSC) will be described with reference to FIGS. 2 and 3. The front end width (rear end width) "We" of the tapered waveguide can have a value giving optimum conversion efficiency with the longest wavelength in a plurality of wavelengths that are used. Here, as shown in FIG. 3, an orthogonal coordinate system is defined. The taper staring point is the origin, the waveguide direction is the X direction, and the direction along the width of the waveguide is the Y direction. At this time, the waveguide width "W" of a tapered area of the first spot size converting part 2 at a distance in waveguide direction "x=Z" can be expressed by the following equation (1). Furthermore, the total length "Zo" of the taper can be about 1 to 2 mm. In the equation (1), the constant "α" can be about 0.01 to 0.03.

$$We=(W0-W\infty)\times\exp(-\alpha\times Z/(W0-W\infty))+W\infty \quad (1)$$

W0: waveguide width at taper starting position

W∞: waveguide width at infinite distance (Z=∞)

Figure 4:
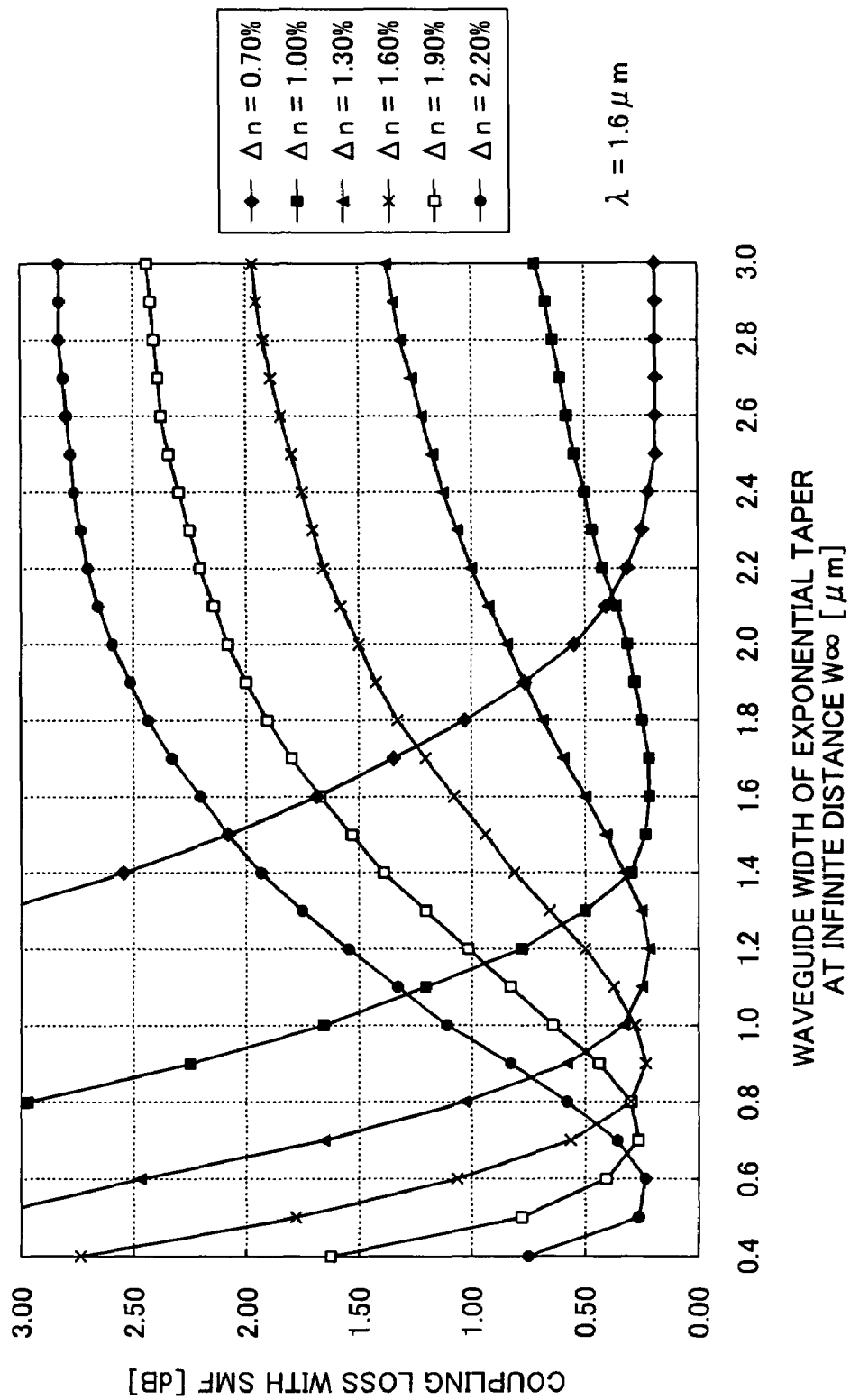
FIG. 4 shows the result of BPM simulation using a model of an exponentially tapered waveguide.

FIG. 4 shows the result of BPM (Beam Propagation Method) simulation using an exemplary model of an exponentially tapered waveguide expressed by the equation (1) described above. The simulation result shows a relation between the waveguide width "W∞" of the exponential taper at infinite distance and a coupling loss with the SMF where the waveguide width "W∞" is varied using a relative refractive index difference Δn as a parameter. For calculation, the wavelength of light is 1.6 μm for which the effect of enlargement of the spot size is high. Note that "W0" is 4.5 μm, "Zo" is 1600 μm, "α" is 0.01, and the height of the waveguide is 3.5 μm.

In the example described above, the side face of the tapered waveguide includes an exponential curve. However, if the amount of decrease in waveguide width at a taper starting position is large, and the amount of decrease in waveguide width becomes smaller as going toward the front edge, the side face of the waveguide does not necessarily consist of an exponential curve. Instead, the side face of the waveguide may consist of an n-order functional curve (n is an integer of 2 or greater). Further, when the very small length in the waveguide direction is Δx and the amount of decrease in width is Δy, the ratio of the amount of decrease in width to the very small length in the waveguide direction (Δy/Δx) may be smaller at a position closer to the second spot size converting part 3.

If the optical waveguide coupler 1 is applied to the PLC module, it is necessary to set Δn to a higher value for reducing the coupling loss between the LD and the optical waveguide. However, if Δn is set to an excessively high value, the required mounting accuracy of the LD becomes strict. Specifically, if Δn is increased, the spot size of the optical waveguide decreases. Consequently, an excess loss at the time of optimum coupling decreases. On the other hand, the amount of increase in excess loss resulting from misalignment between the LD and the optical waveguide increases (tolerance for the LD mounting position decreases). Therefore, in an exemplary aspect, Δn can be about 1.2 to 1.8%. For explanation with FIG. 4 taking Δn=1.3% as an example, it is apparent that the coupling loss hits bottom (minimum) at W∞=1.2 μm, and the coupling loss increases if "W∞" is either greater or smaller than this value.

Here, an actual front end width of the tapered waveguide is "We", and an ideal waveguide width leading to a minimum coupling loss is "Wb". Then, for preventing occurrence of an excess loss, it is desirable that "We" should equal to "Wb" (We=Wb. As an example, We=Wb=1.226 μm if wavelength=1.6 μm, W0=4.5 μm, Zo=1600 μm, α=0.01).

If "We" is greater than "Wb" (WE>Wb), the effect of confinement of light is so high that the spot size is not sufficiently enlarged. As a result, a mode mismatch between the spot sizes of the waveguide and the SMF arises, and thereby an excess loss occurs.

In contrast to this, if "We" is smaller than "Wb" (We<Wb), light can no longer be coupled to the waveguide. Therefore, light radiates to outside, and thereby an excess loss occurs. Light once radiating to the outside is no longer optically coupled to the waveguide again.

The sensitivity to degradation is higher when "We" is smaller than "Wb" (We<Wb) than when "We" is greater than "Wb" (We>Wb). In other words, the amount of increase in coupling loss is large if the amount of change in the waveguide width is the same.

The confinement effect of light in the waveguide becomes lower as the wavelength of light becomes long. As a result, "Wb" is larger for light of a longer wavelength. Thus, "Wb" for light of the longest wavelength can be used as a design value. If "Wb" is used as a design value for light of a wavelength other than the longest wavelength, light of the longest wavelength abruptly declines in coupling.

Light outputted from the first spot size converting part 2 designed in accordance with the aforementioned requirement can have a spot size enlarged to the extent that the characteristic of coupling with the optical fiber is improved as for light of the longest wavelength. However, confinement of light becomes stronger as the wavelength is shortened, and light of a shorter wavelength does not have a spot size sufficiently enlarged. Therefore, for light of a short wavelength, the efficiency of coupling with the optical fiber is still low.

Thus, for light of a short wavelength which does not have a spot size sufficiently enlarged by the first spot size converting part, the spot size can then be further enlarged by the second spot size converting part.

The periodically segmented waveguide constituting the second spot size converting part 3 preferably meets the following requirement:

$$Ws=R\times Wb \quad 1.0\leq R\leq 1.5$$

$$L\geq D$$

wherein "Ws" represents a waveguide width of the periodically segmented waveguide, L represents a waveguide length thereof, and D represents a gap length thereof.

The periodically segmented waveguide controls the effect of diffraction of light to enlarge the spot size. The effect of diffraction of light is higher for light of shorter wavelength. Namely, by placing the periodically segmented waveguide in the rear stage of the tapered waveguide, the spot size of light of a short wavelength which could not be sufficiently enlarged can be enlarged. Values of structural parameters at the periodically segmented waveguide (waveguide width, waveguide length and gap length) are selected so that the spot size of light of a short wavelength increases as much as possible. It should be emphasized that even though the structural parameters at the periodically segmented waveguide can be selected so as to meet such a requirement, the coupling characteristic of light of a long wavelength optimized by the tapered waveguide can be little influenced. This will be described in detail later.

The width "Ws" of the periodically segmented waveguide placed in the rear stage is equal to or greater than "Wb". This is because if the width of the periodically segmented waveguide is smaller than "Wb", light of the longest wavelength can no longer be coupled to the waveguide. If the width of the waveguide is too large, the spot size of light of the longest wavelength enlarged by the tapered waveguide in the front stage decreases again with the light strongly coupled to the waveguide. Therefore, "Ws" can be determined to be "Wb×1.5" or less.

For wavelength bands that are used for the optical communication purpose, the band of 1.3 μm and the band of 1.5 μm can be mainstream. More specifically, in the subscriber system, light with an upstream wavelength of 1.31 μm and a downstream wavelength of 1.49 μm is generally can be used. In a system, such as Triplexer using triple wavelengths in the CATV (Community Antenna Television) and the like, light of 1.55 μm can further be used as an analog signal. If considering wavelength fluctuations resulting from the temperature characteristic of the LD, the wavelength that is used in a general subscriber optical communication can be in the range of 1.2 μm to 1.6 μm. The longest wavelength in this case is 1.6 μm. In FIG. 4, optimum "W∞" minimizing coupling loss is about 1.2 μm if the wavelength is 1.6 μm and Δn is 1.3%. As described above, it is desirable that the waveguide width "Ws" of the periodically segmented waveguide should be almost equal to the ideal waveguide width "Wb" minimizing coupling loss. Namely, Ws=Wb (as an example, Ws=Wb=1.226 μm if W0=4.5 μm, Zo=1600 μm, α=0.01).

Next, structural parameters (waveguide width, period, waveguide length, gap length and the like) of the second spot size converting part 3 (periodically segmented waveguide or segmented SSC) will now be exemplarily described with reference to FIG. 2. The waveguide width is represented by "Ws", the segmented period is represented by "P", the waveguide length is represented by "L", and the gap length is represented by "D". For convenience of explanation, the exemplarily periodically segmented waveguide is arranged with a constant period and a constant gap. It is noted that the arrangement of the periodically segmented waveguide is not limited thereto.

Figure 5:
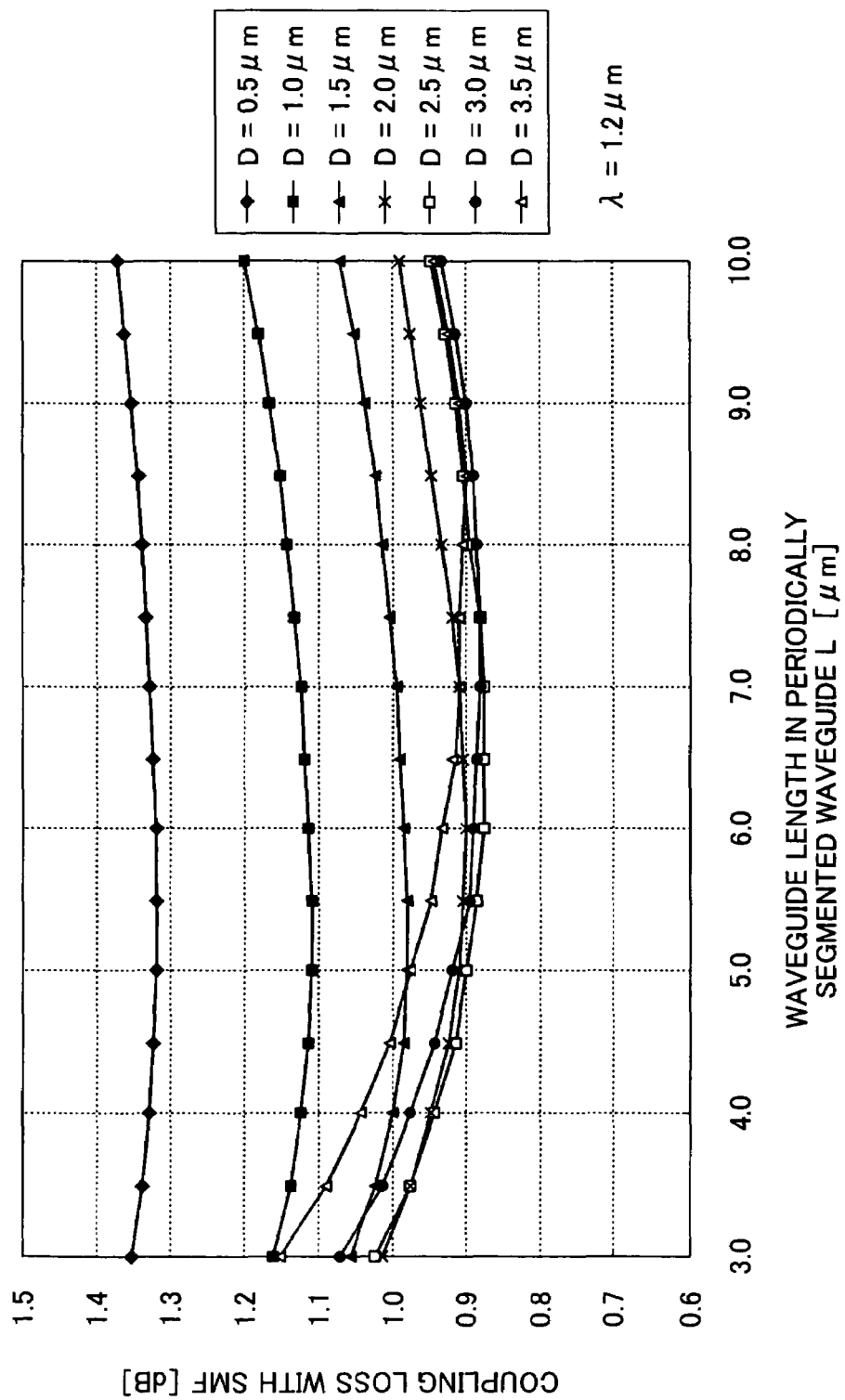
FIG. 5 shows the result of BPM simulation using an exemplary model of a periodically segmented waveguide.

FIG. 5 shows the result of BPM simulation using a model of a periodically segmented waveguide. The simulation result shows a relation of the coupling loss with the SMF to the periodically segmented waveguide length "L" using the gap length "D" of the waveguide as a parameter. For calculation, the wavelength of light is 1.2 μm for which the effect of enlargement of the spot size is high. Ws=Wb=1.226 μm, Δn=1.3%, and the number of segmentations is 10.

If the gap length "D" is set to a certain value, the waveguide length "L" minimizing coupling loss is uniquely determined. This optimum value "L" is represented as "Lb(D)". It is apparent from FIG. 5 that there is also an optimum value for the gap length "D". Namely, in this case, the coupling loss is a minimum with "Lb(2.5)=about 6.5 μm" when the gap length "D" equals 2.5 μm. Such a value "D" is present uniquely for each Δn. This optimum value is represented as "Db".

Figure 6A:
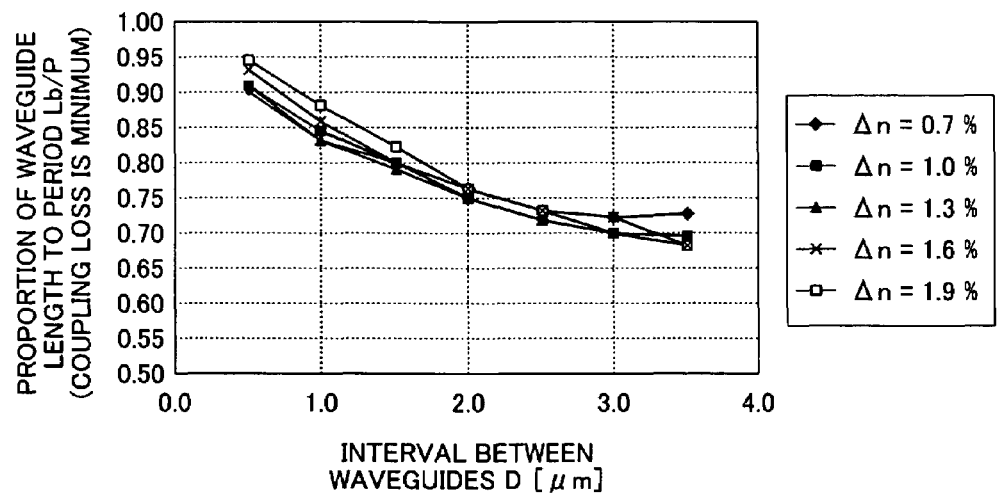
FIG. 6A exemplarily shows a relation between a gap between periodically segmented waveguides and a proportion of a waveguide length to a period.
Figure 6B:
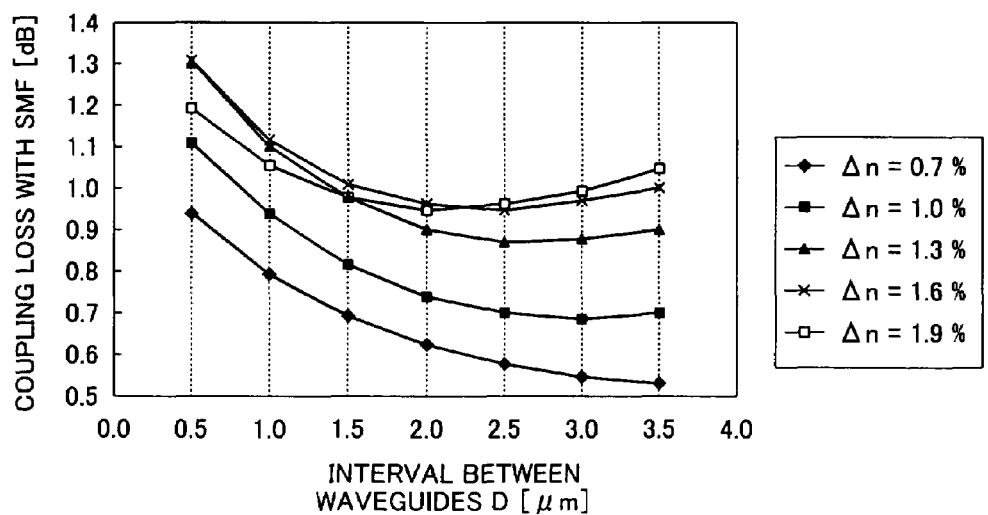
FIG. 6B exemplarily shows a relation between a gap between periodically segmented waveguides and a coupling loss with a SMF.
Figure 7:
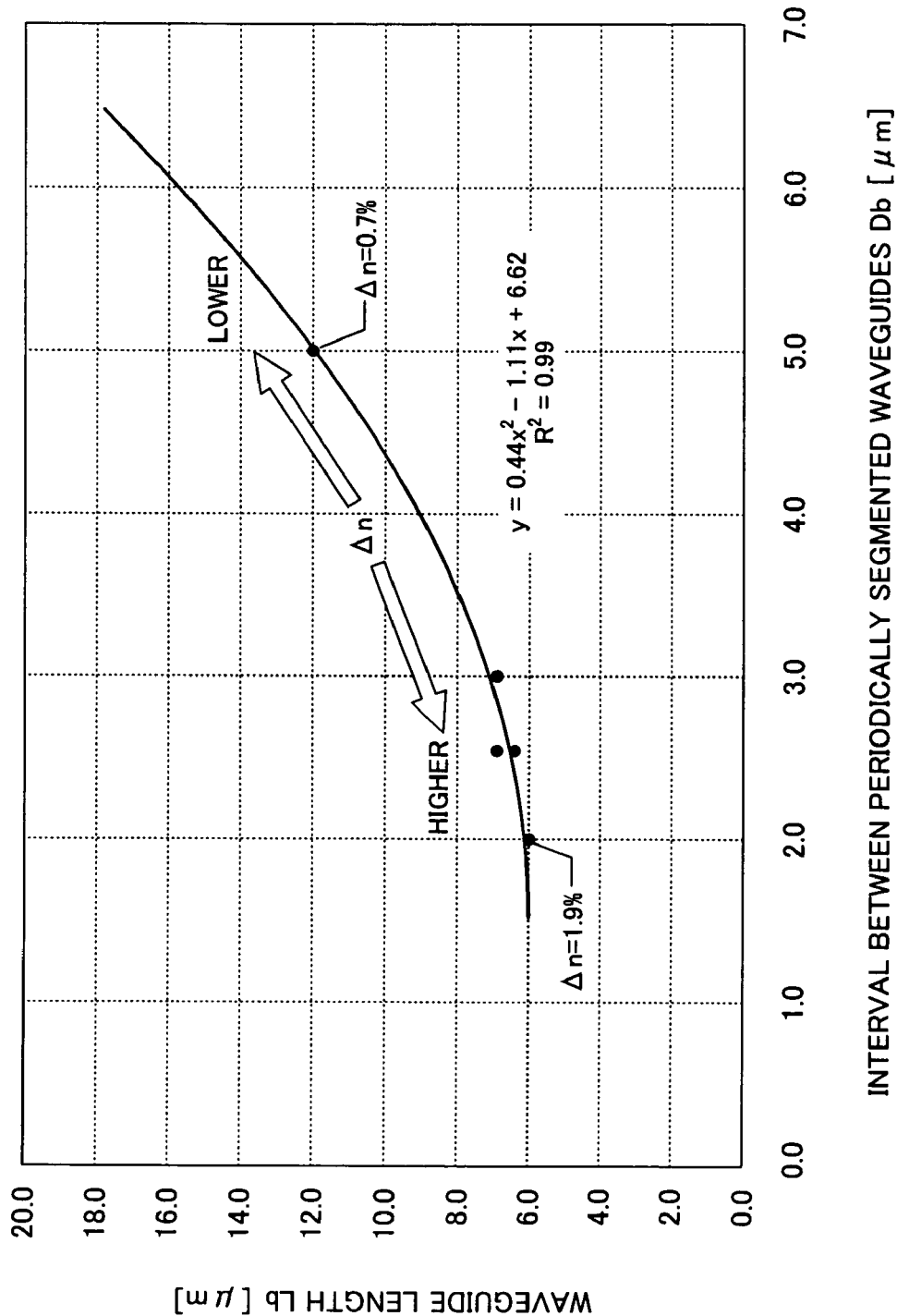
FIG. 7 exemplarily shows a relation between the gap between periodically segmented waveguides and an optimum waveguide length.

FIG. 6A shows the result of calculation for a proportion "Lb/P" of the waveguide length minimizing coupling loss to the period when the gap length "D" between periodically segmented waveguides is changed, using Δn as a parameter. The period "P" is set to "(Lb+D)". FIG. 6B shows the result of calculation for the coupling loss with the SMF when the gap length "D" is changed. FIG. 7 shows a relation between the optimum gap length "Db" between periodically segmented waveguides and the optimum waveguide length "Lb". Needless to say, calculation is performed with "Wb" changed as Δn is changed. From FIG. 7, it is apparent that "Db" decreases as Δn increases. This is due to the fact that the higher the Δn, the higher the diffraction effect. As long as at least the requirement of Δn≧0.7% is met, "Db" generally will not exceed 5 μm. Thus, for Δn that is set, the approximate waveguide length "L" and gap length "D" of the waveguide can be determined from the curve of FIG. 7. However, the gap length "D" of the waveguide has a lower limit due to difficulties of the production process. In a general optical waveguide process, the lower limit generally is known for 1 to 3 μm. Therefore, as for "D", fabrication with a desired value "Db" can be difficult. In this exemplary case, the waveguide length "L" can be determined in accordance with FIG. 6A by setting a value enabling stable production to "D". According to FIG. 6A, a change in "Lb/P" decreases as "D" increases. In addition, as described above, "Db" never exceeds 5 μm at "Δn≧0.7%". Therefore, it can be determined that "Lb/P" is not less than 0.5.

Namely, the relation can be expressed as follows:

$$Lb/P \geq 0.5$$

$$Lb \geq D \times 0.5/(1-0.5)$$

$$Lb \geq D \qquad (2)$$

It should be emphasized that light of 1.6 μm, i.e., the longest wavelength, can be sufficiently enlarged by the tapered waveguide in the front stage, and therefore, hard to be influenced by the periodically segmented waveguide in the rear stage. Light becomes closer to collimated light (parallel light) as the spot size is enlarged. Therefore, the light is hardly influenced by diffraction in the periodically segmented waveguide. Thus, the spot size of light on the long wavelength side enlarged by the tapered waveguide generally will not be significantly influenced by the periodically segmented waveguide. In other words, there generally is no possibility that light is no longer coupled to the waveguide due to excessive enlargement of the spot size of light on the long wavelength side or radiation of light to outside. Thus, in the periodically segmented waveguide in the rear stage, the spot size of light on the short wavelength side can be enlarged selectively and effectively.

Figure 8:
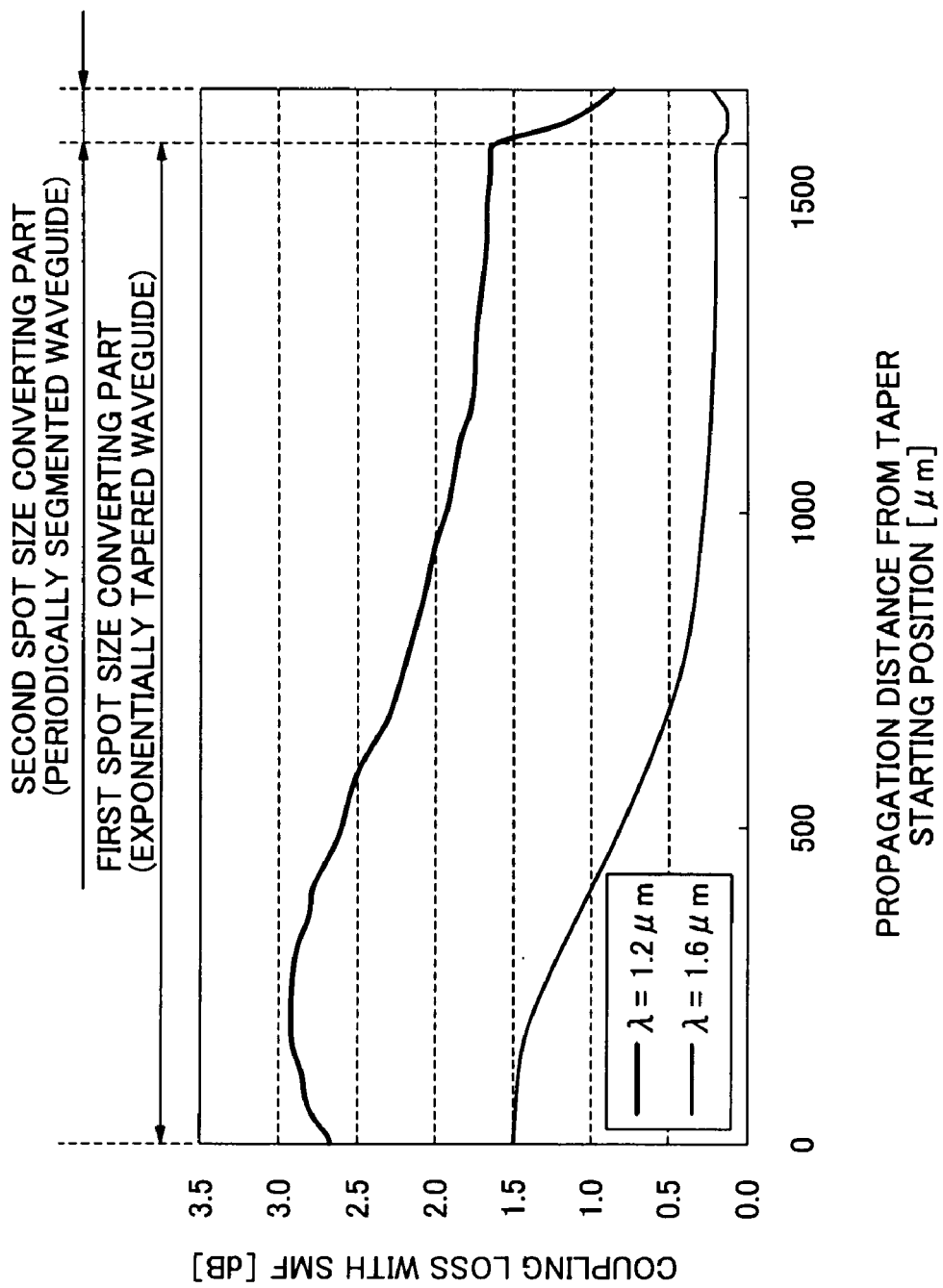
FIG. 8 shows a coupling loss of the optical waveguide coupler according to the first embodiment to the SMF.

FIG. 8 shows the result of calculating the coupling loss with the SMF by the BPM (Beam Propagation Method) at each position in the optical waveguide coupler according to this exemplary aspect. Note that Δn=1.3%, W0=4.5 μm, Zo=1600 μm, We=1.2 μm, α=0.01, L=6.5 μm, D=2.5 μm, the number of segmentations is 10, and the height of the waveguide is 3.5 μm. As shown in FIG. 8, for light of the shortest wavelength (1.2 μm), the coupling loss can be a minimum at the terminal end of the second spot size converting part 3. For light of the longest wavelength (1.6 μm), the coupling loss at the terminal end of the first spot size converting part 2 can be almost retained at the terminal end of the second spot size converting part 3.

It should be emphasized that the wavelength dependency of the second spot size converting part 3 can act to cancel the wavelength dependency of the first spot size converting part 2. The first spot size converting part 2 can be a tapered waveguide, and therefore, can have a low spot size converting effect at a short wavelength as described above. Namely, the effect of enlargement of the spot size for light of a wavelength of 1.2 μm is lower than that for light of a wavelength of 1.6 μm. On the other hand, the second spot size converting part 3 in the rear stage can be a periodically segmented waveguide, and therefore, its spot size converting effect can be high for light of a shorter wavelength. Namely, the effect of enlargement of the spot size for light of a wavelength of 1.2 μm is higher than that for light of a wavelength of 1.6 μm. In the second spot size converting part 3, the mode of light of a long wavelength can be more or less disturbed, but the spot size has been already enlarged, and therefore, the influence of the disturbance can be insignificant. This is because light becomes closer to collimated light (parallel light) as the spot size is enlarged, and therefore, the diffraction of the light can be difficult to influence in the periodically segmented waveguide. In this example, segmentation parameters (gap, waveguide length and the like) of the second spot size converting part 3 can be optimized such that the enlargement effect can be a maximum for light of a wavelength of 1.2 μm. Therefore, here, the spot size of light of a wavelength of 1.2 μm can be selectively enlarged, and therefore, the coupling loss with the SMF can be reduced.

Figure 9:
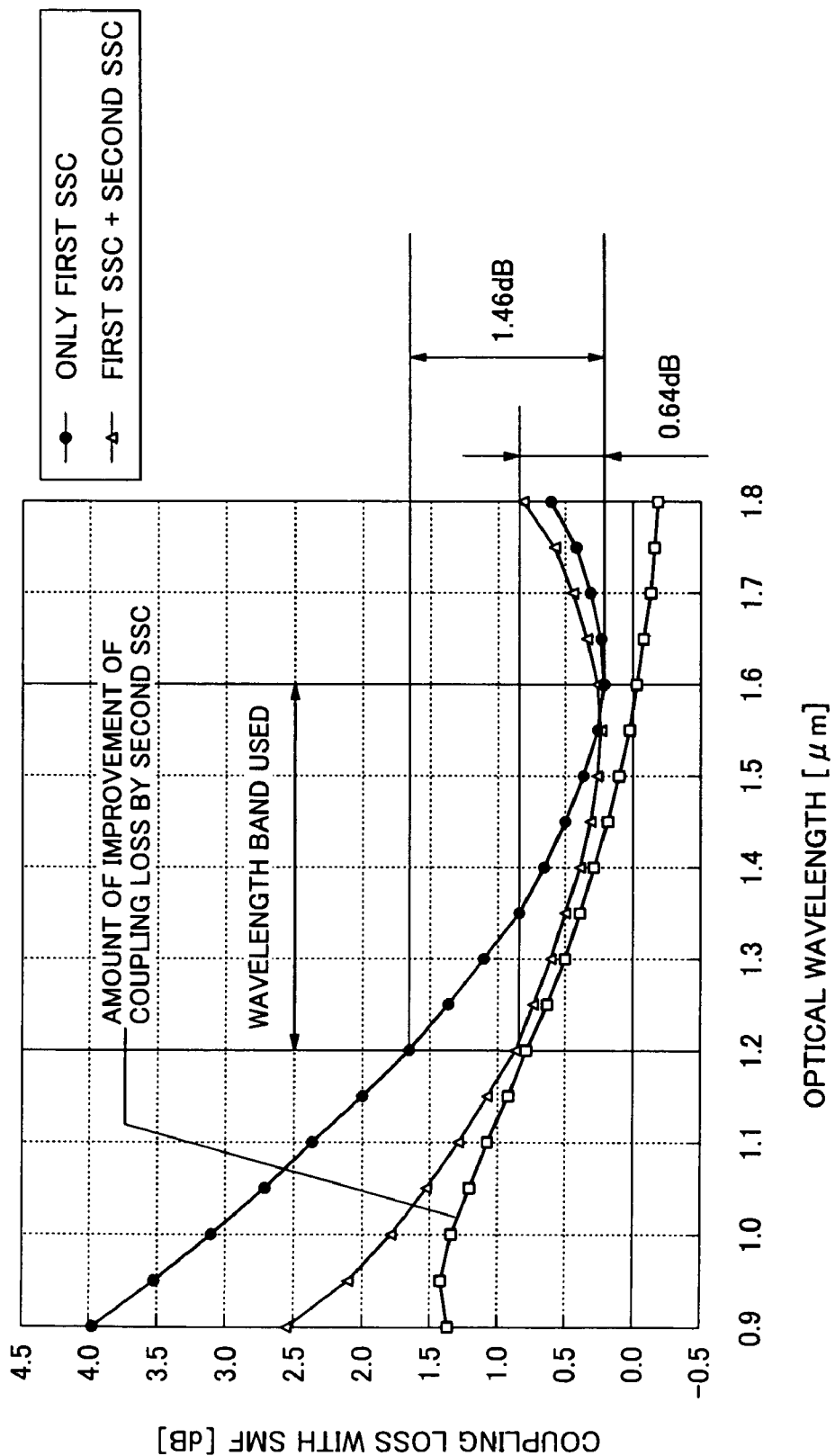
FIG. 9 shows dependency of the optical waveguide coupler according to an exemplary aspect of the invention on the wavelength.

FIG. 9 shows the result of calculation by the BPM for the wavelength characteristic of the optical waveguide coupler according to this exemplary aspect. The simulation result shows a comparison between the optical waveguide coupler provided with only the first SSC (exponentially tapered waveguide) (provided with no second SSC in the rear stage) and the optical waveguide coupler according to the exemplary aspect (provided with the second SSC in the rear stage of the first SSC). When only the first SSC (exponentially tapered waveguide) is provided, the wavelength dependency is 1.46 dB in the operational wavelength band of 1.2 to 1.6 μm. In contrast to this, when the first SSC and the second SSC (periodically segmented waveguide) are provided, the wavelength dependency is 0.64 dB. The effect of reduction of the wavelength dependency is about 56%. For reference, a difference between the former and latter optical waveguide couplers, i.e. the amount of improvement of the coupling loss by the second SSC is also exemplarily shown in this figure. As a result, it can be found that for the second SSC, the improvement effect can be higher for a shorter wavelength.

Figure 10:
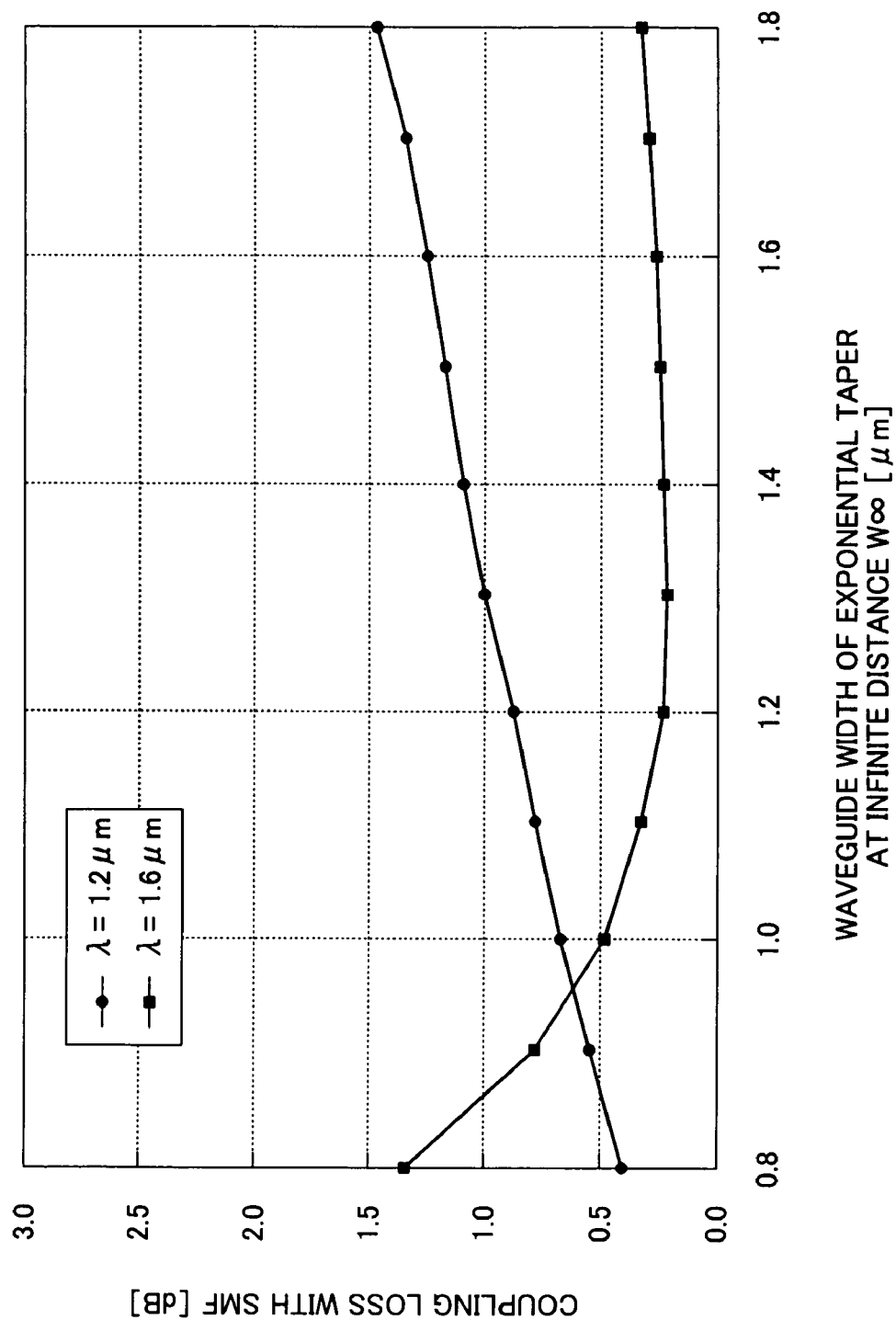
FIG. 10 shows a tolerance of a waveguide width of the optical waveguide coupler according to an exemplary aspect of the invention.
Figure 11:
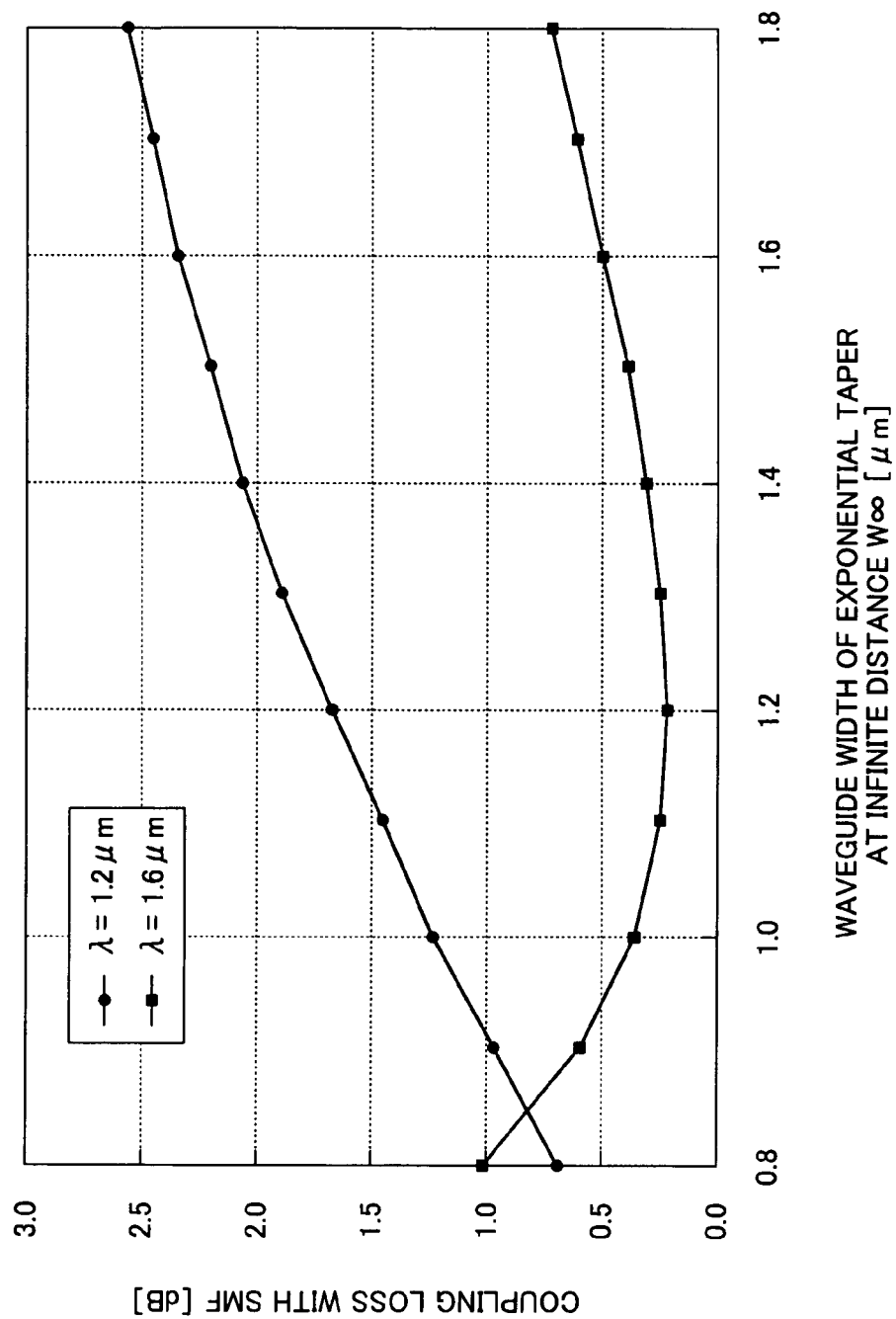
FIG. 11 exemplarily shows a tolerance of a waveguide width of an exponentially tapered waveguide having no periodically segmented waveguide in the rear stage.

Next, in this exemplary aspect, the tolerance of the waveguide width at the end (infinite distance) for the coupling loss with the SMF can be calculated by the BPM. FIG. 10 shows the result of calculation when the wavelength is 1.2 μm. FIG. 11 shows the result of calculation when no second spot size converting part 2 (periodically segmented waveguide) is provided in the rear stage (i.e. only the exponentially tapered waveguide is provided) as a comparison. Fluctuations in the coupling loss at a wavelength of 1.2 μm in FIG. 10 are smaller than those in FIG. 11. As a result, it is apparent that in the configuration according to this exemplary aspect, the tolerance of the waveguide width at the end for the coupling loss can be considerably alleviated compared with the case where no periodically segmented waveguide is provided.

As described above, the optical waveguide coupler according to the exemplary aspect of the present invention can have low wavelength dependency and can allow the production tolerance to be increased. The optical waveguide coupler of this exemplary aspect can optically couple an optical waveguide and an optical component having mutually different spot sizes with high efficiency with respect to optical signals of a plurality of wavelength bands. Note that the structure of this exemplary aspect can have an effect of converting the spot size for light input from either the A side or the B side.

Figure 12:
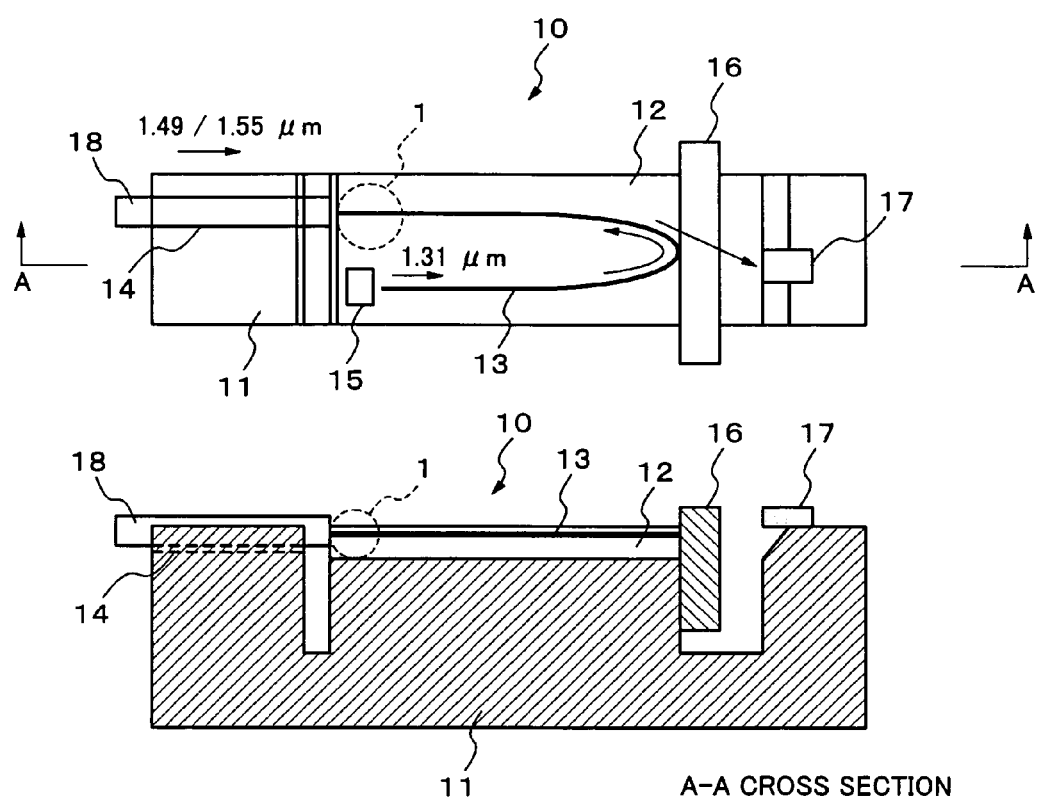
FIG. 12 shows a structure of a PLC unit according to an exemplary aspect of the present invention.
Figure 13:
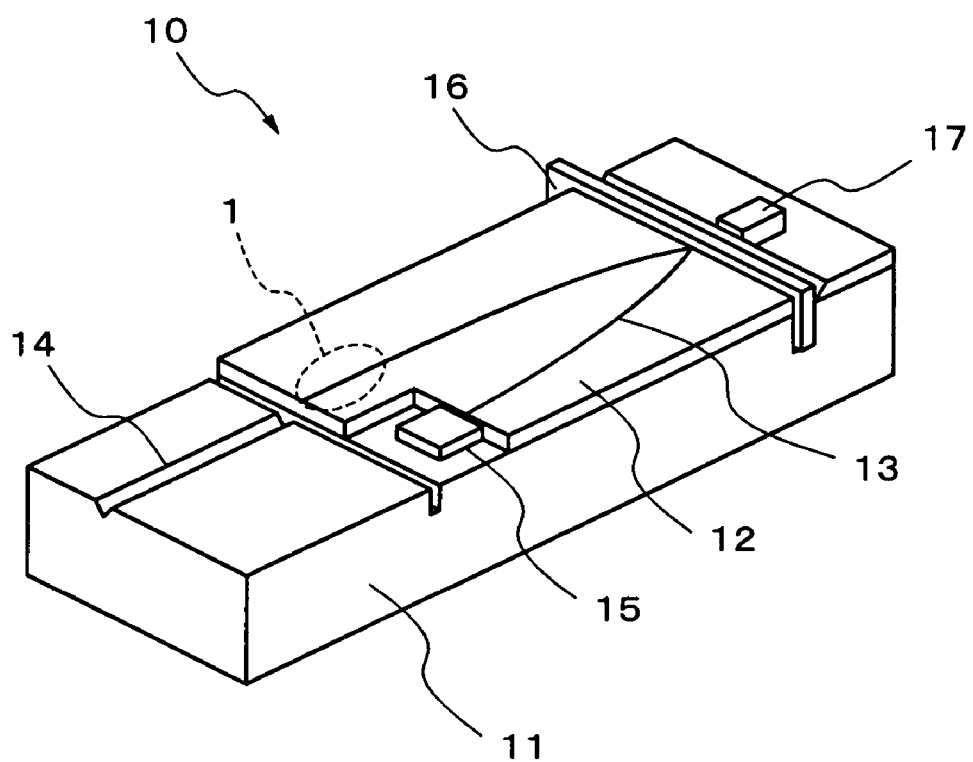
FIG. 13 is a perspective view of the PLC unit according to an exemplary aspect of the present invention.

The specific configuration of an assembled optical unit according to an exemplary aspect of the present invention will be described below. FIG. 12 shows the structure of a PLC (Planner Lightwave Circuit) unit as one example of the assembled optical unit according to this exemplary aspect. FIG. 13 is a perspective view of this PLC unit (before mounting of an optical fiber). The PLC unit is intended for bidirectional communication over a single cable for PON.ONU.

The PLC unit 10 can include an optical waveguide (core) 13 formed to be turned back in a shape substantially of a "V" on a silica layer 12 deposited on a substrate 11, and the aforementioned optical waveguide coupler 1 at one end the optical waveguide 13. Furthermore, a V-shaped groove 14 can be formed at the tip of the optical waveguide coupler 1, and an optical fiber 18 can be mounted thereon. On the substrate 11, various kinds of optical components can be mounted, i.e., a laser diode (LD) 15 can be mounted at the tip of the other end, a WDM (Wavelength division multiplexing) filter 16 can be mounted on a turned area, and a Photo Diode (PD) 17 can be mounted at a position opposite to the WDM filter.

The substrate 11 can be formed of, for example, silicon and the like, and the V-shaped groove 14 can be formed by selective etching or the like. The optical waveguide coupler 1 can have the characteristics described above, and optically couples between the optical fiber 18 mounted on the V-shaped groove 14 and the optical waveguide (core 13) formed inside of silica layer 12. The LD 15 can be optically coupled to the other end of the optical waveguide 13. The WDM filter 16 can allow light to pass therethrough and can reflect light selectively with respect to the wavelength, and light which has passed through the filter can be received at the PD 17.

Operations of the PLC unit 10 will be described below. In the case of a PON system consisted as a bidirectional communication over a single cable in an optical subscriber system, a wavelength of 1.31 μm is used as transmission light and a wavelength of 1.49 μm is used as reception light on the subscriber side (ONU: Optical Network Unit). In the case of a system including analog signals, such as a CATV, light of a wavelength of 1.55 μm is also used as reception light. Specifically, light of a wavelength of 1.31 μm is emitted as transmission light from the LD 15. The transmission light passes through the optical waveguide 13, and is selectively reflected at the WDM filter 16, and coupled to the optical fiber 18 via the optical waveguide coupler 1. On the other hand, light of a wavelength of 1.49 μm or 1.55 μm is received as reception light from the optical fiber 18. The reception light is coupled to the optical waveguide 13 via the optical waveguide coupler 1, selectively allowed to pass through the WDM filter 16, and received at the PD 17. Thus, light of different wavelengths in transmission and reception should be optically coupled efficiently between the optical fiber 18 and the optical waveguide (core) 13 having different spot sizes. Thus, the optical waveguide coupler 1 plays a role of coupling between the optical fiber and optical waveguide with high efficiency as described above, with respect to light of different wavelengths.

Figure 14:
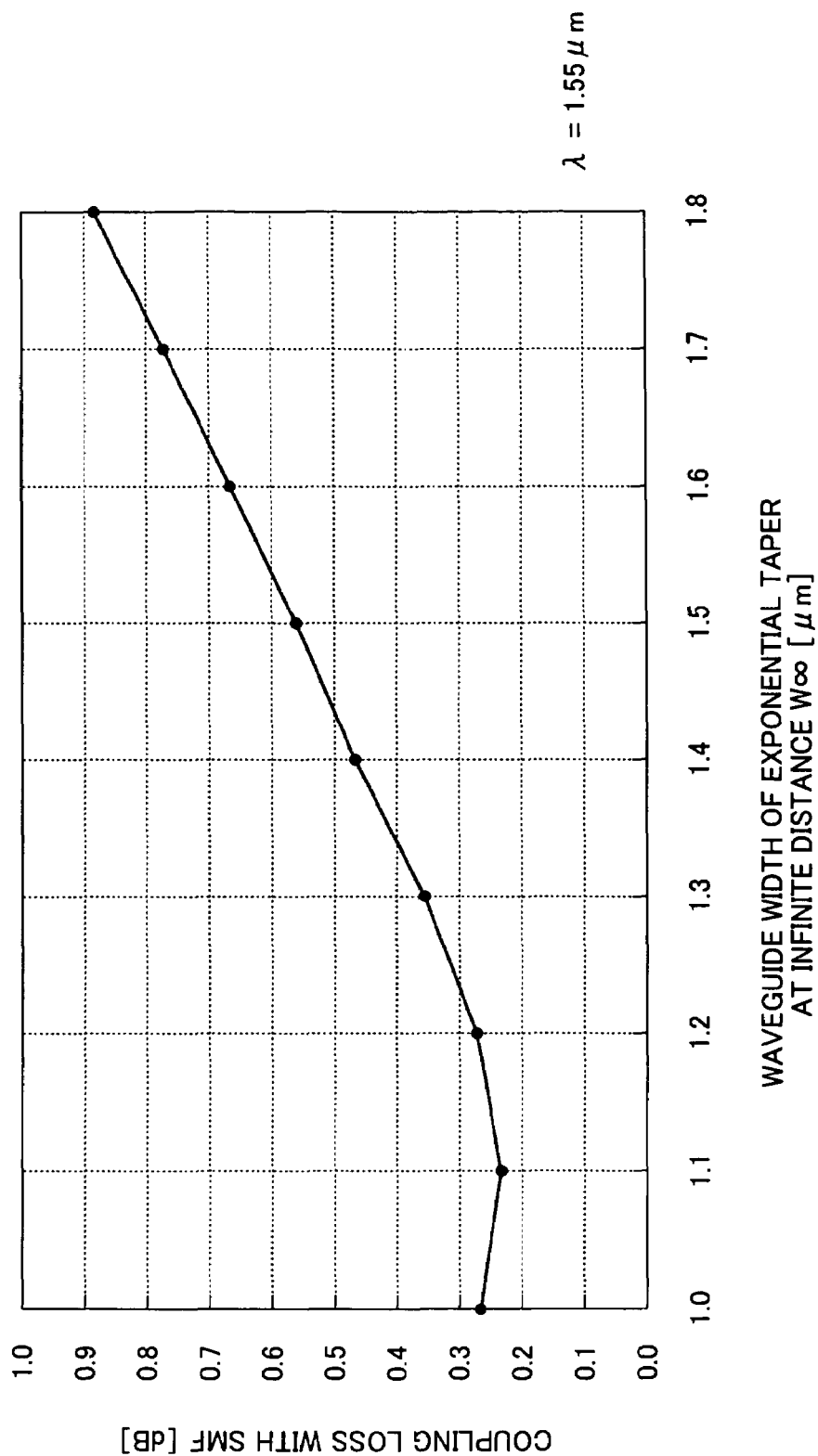
FIG. 14 exemplarily shows a relation between the waveguide width of the exponentially tapered waveguide and the coupling loss with the SMF.

For this optical waveguide coupler 1, parameters of the tapered waveguide can be set with Δn being 1.3%. FIG. 14 shows the result of calculating "W∞" at a wavelength of 1.55 μm by the BPM in the same manner as in FIG. 4 because the longest wavelength is 1.55 μm. From this figure, "W∞" minimizing coupling loss with the SMF is 1.1 μm. In this connection, W0=4.5 μm, Zo=1600 μm and α=0.01. Thus, from the equation (1) described above, the front end width "We" of the tapered waveguide is 1.131 μm.

Figure 15:
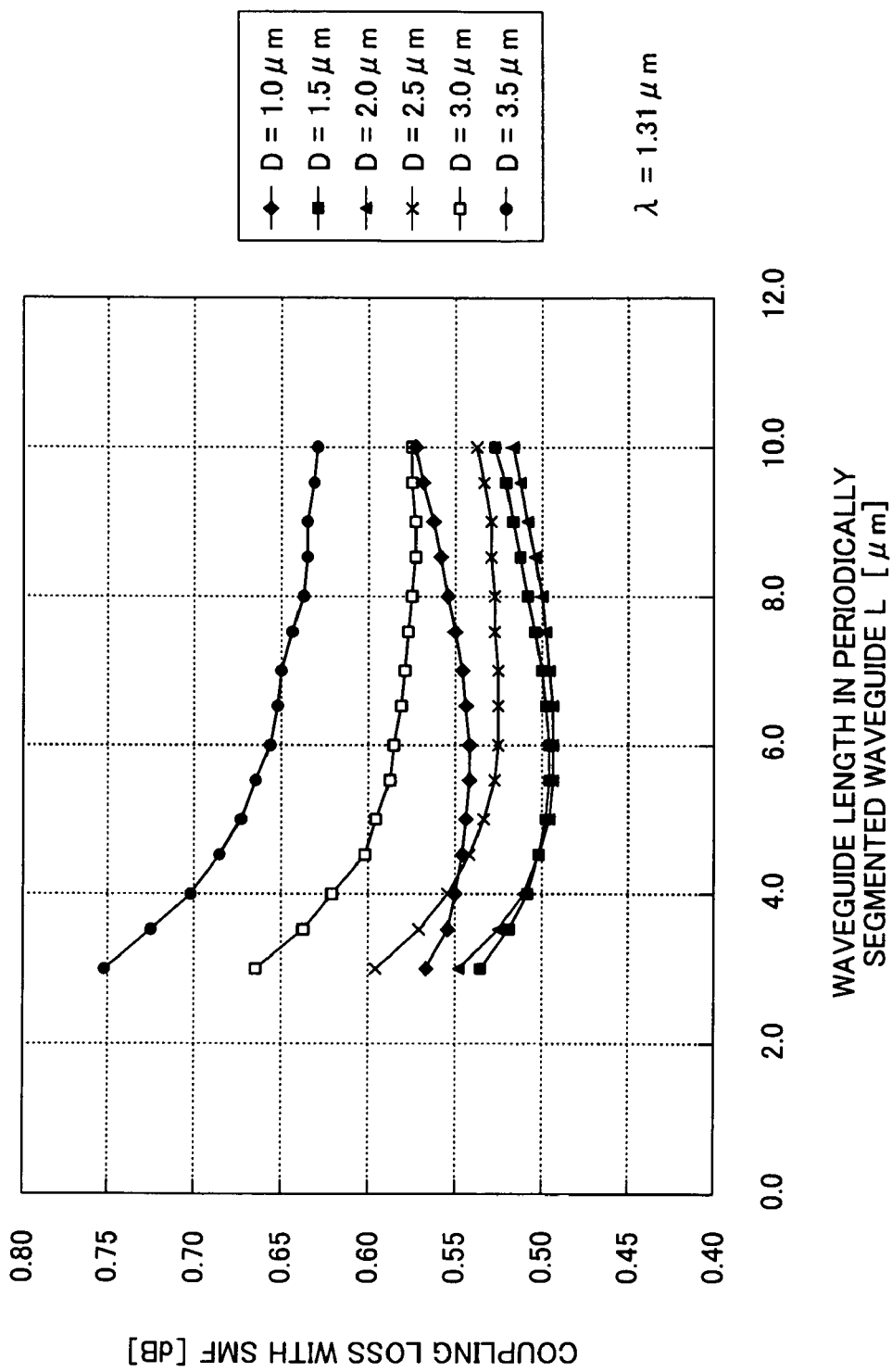
FIG. 15 exemplarily shows a relation between the waveguide length of the periodically segmented waveguide and the coupling loss with a SMF.

Next, FIG. 15 shows the result of conducting simulation at a wavelength of 1.31 μm in the same manner as in FIG. 5 for the shortest wavelength of 1.31 μm with the waveguide width "Ws" of the periodically segmented waveguide equal to "We". From the result of this example, the optimum waveguide length "Lb" is 6 μm and the optimum gap length "Db" between waveguides is 2 μm. It is apparent that this is positioned roughly on the approximate curve of FIG. 7.

Figure 16A:
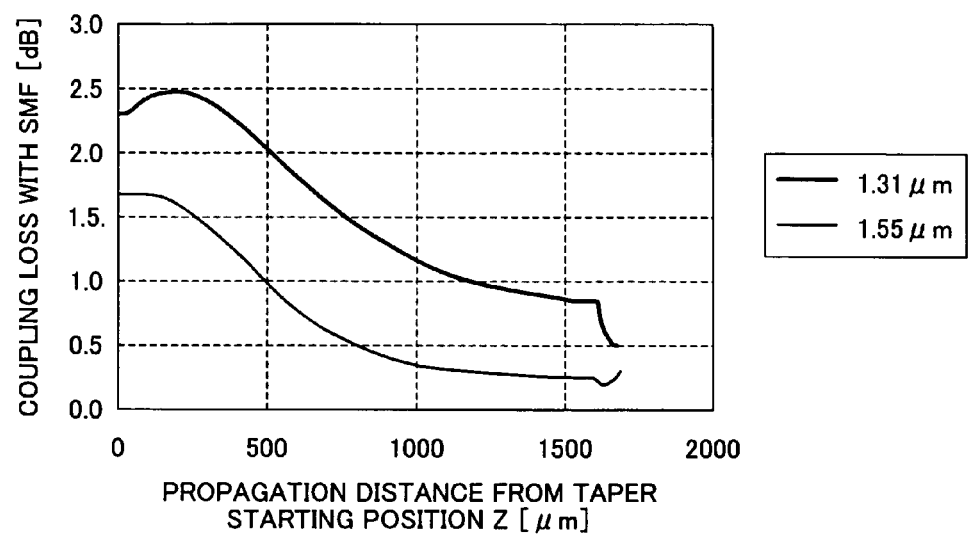
FIG. 16A exemplarily shows a relation between a propagation distance from a taper starting position and the coupling loss with the SMF.
Figure 16B:
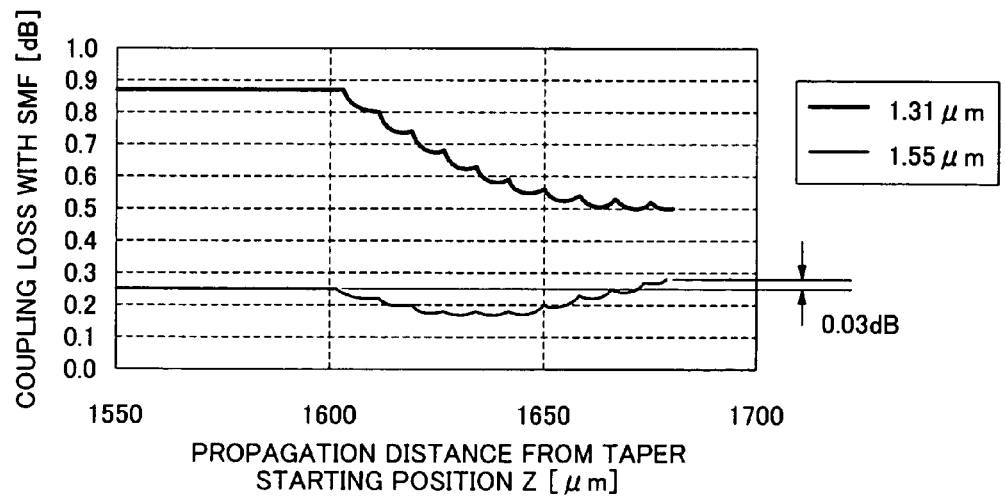
FIG. 16B is an enlarged view where the propagation distance in FIG. 16A is 1550 µm or greater.

FIG. 16A shows the result of calculating the coupling loss with the SMF over a propagation distance Z from the taper starting position for light of wavelengths of 1.31 μm and 1.55 μm. FIG. 16B shows an enlarged view of a part having a propagation distance of 1550 μm or greater. From this exemplary figure, it is apparent that, in the second spot size converting part (Z is 1600 μm or greater), the coupling loss with the SMF for light of a wavelength of 1.31 μm can be selectively improved. This is because the spot size of light of a wavelength of 1.31 μm is selectively enlarged. The coupling loss deteriorated at a wavelength of 1.55 μm is very low, i.e. 0.03 dB.

Figure 17:
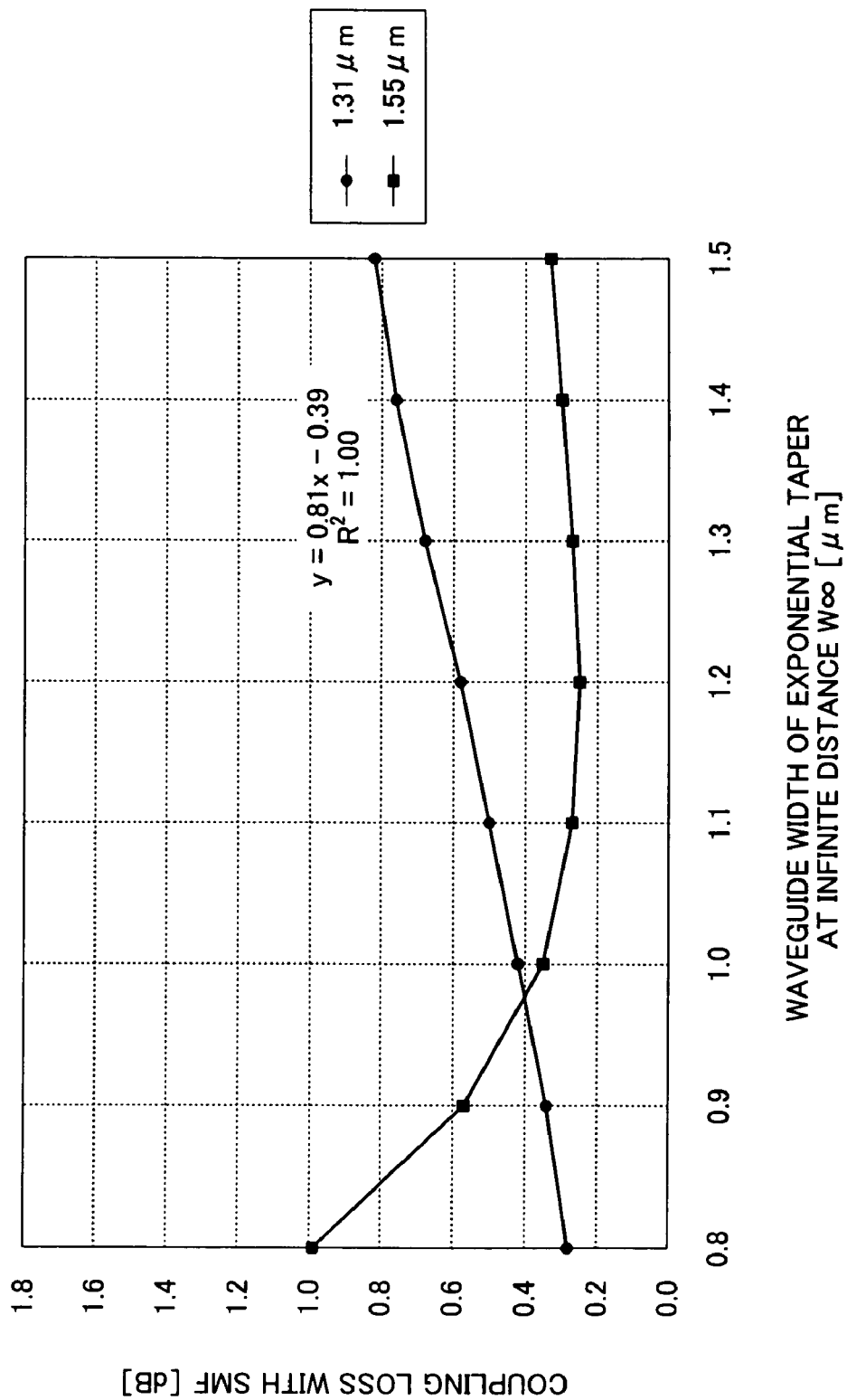
FIG. 17 shows a relation of the coupling loss with the SMF to the waveguide width of the optical waveguide coupler according to an exemplary aspect of the invention.
Figure 18:
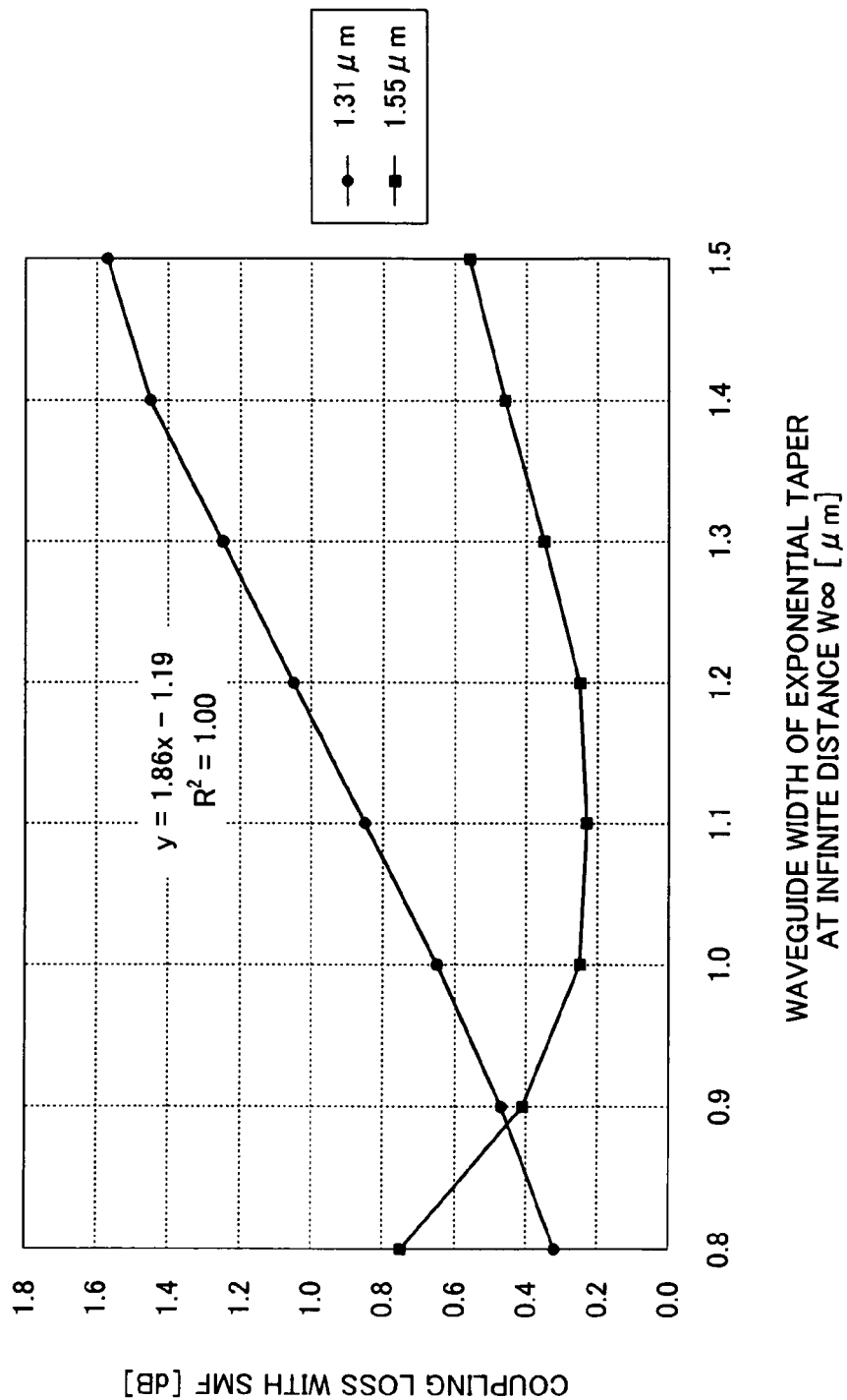
FIG. 18 exemplarily shows a relation between the waveguide width of the exponentially tapered waveguide having no periodically segmented waveguide in the rear stage and the coupling loss with the SMF.

FIG. 17 shows the result of calculating the coupling loss with the SMF for the waveguide width. For comparison, FIG. 18 shows the result of calculation for the case where no periodically separated waveguide is added (only the exponentially tapered waveguide is provided). In FIG. 17, the sensitivity (gradient) to "W∞" is reduced for both the wavelengths, and particularly for the wavelength of 1.31 μm, the sensitivity is reduced to a level half that on FIG. 18 or lower. Therefore, for the configuration of this exemplary aspect, production can be easier compared to the case where only the exponentially tapered waveguide is provided. Namely, for the configuration of this exemplary aspect, the coupling loss can be easily kept low compared to the case where only the exponentially tapered waveguide is provided even if the waveguide width varies due to production errors.

Figure 19:
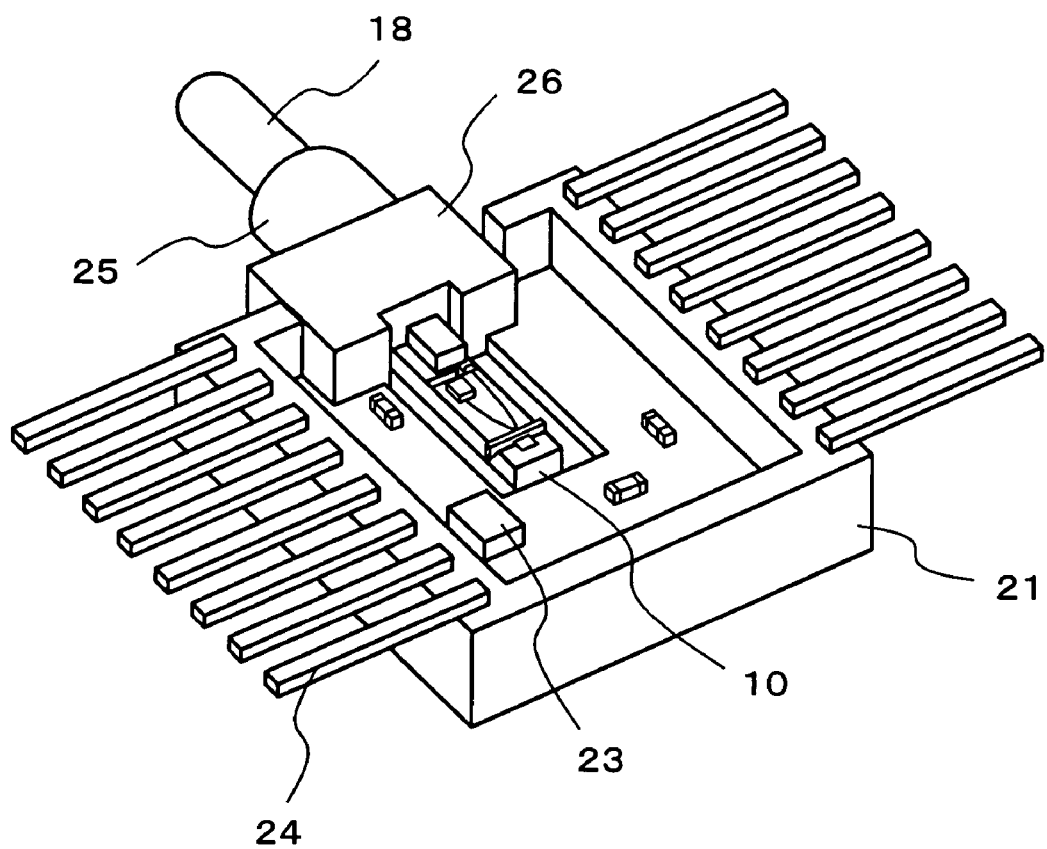
FIG. 19 shows a configuration of an optical module according to an exemplary aspect of the present invention.

The specific configuration of an optical module according to an exemplary aspect of the present invention will described below. FIG. 19 shows one example of the configuration of the optical module according to this exemplary aspect. The optical module can have the aforementioned PLC unit 10 contained in a ceramic package 21. On the ceramic package 21, further a control IC (Integrated Circuit) 23 can be mounted and terminals 24 can be provided. The control IC 23 controls a LD and a PD in the PLC unit 10. The terminal 24 supplies electric power and control signals to the LD in the PLC unit 10, takes out photoelectrically converted signals from the PD, and supplies electric power to the control IC 23. A ferrule 25 can be attached to the optical fiber 18 mounted on the PLC unit 10, and can be fixed to the ceramic package 21 with a flange 26.

As described above, this exemplary aspect can provide the advantages described below.

The structures of the optical waveguide coupler and the sub-assembled optical unit according to this exemplary aspect can provide advantages that the wavelength dependency can be lowered, the production tolerance can be raised, and an optical waveguide and an optical component having mutually different spot sizes can be optically coupled with high efficiency with respect to optical signals of a plurality of wavelength bands. Consequently, in an optical module for bidirectional communication over a single cable, for example, is the exemplary aspects of the invention can provide an advantage that the coupling loss with an optical fiber can be improved with high efficiency even if the optical waveguide is formed into a High Δ state for improving the efficiency of coupling with a LD.

By setting the first spot size converting part to have optimum structural parameters for light of the longest wavelength, and setting the second spot size converting part to have optimum structural parameters for light of the shortest wavelength, their optical coupling can be further optimized.

Further, the exemplary aspects of the invention can provide an advantage that the length of a tapered area decreases to reduce a propagation loss if the first spot size converting part is exponentially tapered. A similar advantage can be obtained if the first spot size converting part is n-order-functionally tapered.

Further, in a sub-assembled optical unit, the exemplary aspects of the invention can provide an advantage that the loss can be reduced because the spot size of the optical waveguide can efficiently be enlarged in both an optical signal band received at the PD and an optical signal band transmitted from the LD. The exemplary aspects of the invention can provide an advantage that the efficiency percentage can be increased and productivity is improved because the production tolerance can be broadened.

The exemplary aspects of the invention also can provide an advantage that a low-power LD (e.g. DFB-LD) can be used.

The exemplary aspects described above are examples of implementations of the present invention, and the present invention is not limited to these exemplary aspects. For example, in the exemplary aspects described above, the case where optical signals of two bands are used is taken as an example, but the present invention also can be applicable when optical signals of three or more bands are used. If the structural parameters of the tapered SSC are determined in accordance with light of the longest wavelength and the structural parameters of the periodically segmented SSC are determined in accordance with light of the shortest wavelength, the spot size of the optical waveguide can efficiently be enlarged for each wavelength component.

In the exemplary aspects described above, an optical fiber for coupling between the SMF and the optical waveguide is taken as an example, but the optical fiber is not limited to the SMF. The optical fiber also can be applicable to a DSF (Dispersion Shifted Fiber) and a DCF (Dispersion Compensating Fiber).

Further, the present invention also can be applicable when the spot size of the optical waveguide is effectively enlarged to optically couple the optical waveguide to another optical component in free space. Namely, the present invention can be applicable when the optical waveguide is optically coupled to an optical component having a larger spot size (photo-detecting element (such as PD), lens, thin film filter, etc.) by space propagation, and so on. Thus, various alterations are possible for the present invention.

While this invention has been described in connection with certain exemplary aspects, it is to be understood that the subject matter encompassed by way of this invention is not to be limited to those specific aspects. On the contrary, it is intended for the subject matter of the invention to include all alternatives, modifications and equivalents as can be included within the spirit and scope of the following claims.

Further, the inventor's intent is to retain all equivalents of the claimed invention and all claim elements even if the claims are amended later during prosecution.

This application is based on Japanese Patent Application No. JP 2005-98804 filed on Mar. 30, 2005, and including a specification, claims, drawings and summary. The disclosure of the above Japanese Patent Application is incorporated herein by reference in its entirety.

What is claimed is:

1. An optical waveguide coupler for optically coupling an optical waveguide and an optical component having mutually different spot sizes, comprising:

a first spot size converting part, adapted to convert a spot size with higher efficiency for an optical signal of a long wavelength band than for an optical signal of a short wavelength band; and a second spot size converting part adapted to convert a spot size with higher efficiency for the optical signal of the short wavelength band than for the optical signal of the long wavelength band, wherein the first spot size converting part and the second spot size converting part are coupled together, and a width of the first spot size converting part is narrowed in a direction toward the second spot size converting part side as the width of the first spot size converting part is substantially equal to a width of the second spot size converting part at a position of coupling.

2. The optical waveguide coupler according to claim 1, wherein the first spot size converting part converts into a largest size a spot size of an optical signal of a longest wavelength of wavelengths to be transmitted, and the second spot size converting part converts into a largest size a spot size of an optical signal of a shortest wavelength of wavelengths to be transmitted.

3. The optical waveguide coupler according to claim 1, wherein the first spot size converting part comprises:
a tapered waveguide with the waveguide width changed.

4. The optical waveguide coupler according to claim 1, wherein the second spot size converting part comprises:
a periodically segmented waveguide segmented along a direction in which light is propagated.

5. The optical waveguide coupler according to claim 3, wherein the tapered waveguide has a curved side face.

6. The optical waveguide coupler according to claim 5, wherein the curve includes an exponential curve.

7. The optical waveguide coupler according to claim 6, wherein, in the tapered waveguide having the exponential curve on the side face, the waveguide width W comprises:
$W=(W0-W\infty)\times\exp(-\alpha\times Z/(W0-W\infty))+W\infty$ ($\alpha$ is constant) (where the waveguide width at the taper starting position is $W0$ and the waveguide width at infinite distance is $W\infty$) at a distance $Z$ from a taper starting position.

8. The optical waveguide coupler according to claim 5, wherein the curve includes an n-order functional (n is equal to or greater than an integer of 2) curve.

9. The optical waveguide coupler according to claim 4, wherein, in the periodically segmented waveguide, the period at which periodically segmented waveguide blocks are arranged is constant.

10. The optical waveguide coupler according to claim 4, wherein in the periodically segmented waveguide, a length obtained by adding a length of the periodically segmented waveguide block to a gap between the waveguide blocks is constant.

11. The optical waveguide coupler according to claim 10, wherein the gap increases as a distance increases away from the tapered waveguide.

12. The optical waveguide coupler according to claim 4, wherein, in the periodically segmented waveguide, the length of the periodically segmented waveguide block is constant.

13. The optical waveguide coupler according to claim 4, wherein, in the periodically segmented waveguide, the gap between the periodically segmented waveguide blocks is constant.

14. The optical waveguide coupler according to claim 1, wherein the short wavelength band includes a band of equal to or less than 1.3 μm.

15. The optical waveguide coupler according to claim 1, wherein the long wavelength band includes a band of equal to or greater than 1.5 μm.

16. An optical waveguide coupler for optically coupling a waveguide and an optical component having mutually different spot sizes, comprising:
first spot size converting means for converting a spot size with higher efficiency for an optical signal of a long wavelength band than for an optical signal of a short wavelength band; and
second spot size converting means for converting a spot size with higher efficiency for the optical signal of the short wavelength band than for the optical signal of the long wavelength band,
wherein the first spot size converting means and the second spot size converting means are coupled together, and
waveguide widths at a position of coupling are substantially equal to each other.

17. The optical waveguide coupler according to claim 16, wherein the first spot size converting means converts into a largest size a spot size of an optical signal of a longest wavelength of wavelengths to be transmitted, and the second spot size converting means converts into a largest size a spot size of an optical signal of a shortest wavelength of wavelengths to be transmitted.

18. A sub-assembled optical unit with a waveguide and an optical component optically coupled, comprising:
a waveguide;
an optical component having a spot size different from that of the waveguide; and
the optical waveguide coupler according to claim 1 at a position of coupling of the waveguide and the optical component.

19. The sub-assembled optical unit according to claim 18, wherein the waveguide and the optical component are aligned and mounted on a same substrate.

20. The sub-assembled optical unit according to claim 19, wherein the optical component comprises an optical fiber.

21. The sub-assembled optical unit according to claim 20, wherein the substrate comprises a silicon substrate,
wherein a V-shaped groove opposite to the waveguide is formed on the silicon substrate, and
wherein the optical fiber is fixed on the V-shaped groove.

22. The sub-assembled optical unit according to claim 21, further comprising:
a Laser Diode (LD) transmitting light;
a Photo Diode (PD) receiving light; and
a Wavelength-Division-Multiplexing (WDM) filter allowing light to pass therethrough or reflecting light selectively,
wherein the waveguide is formed to be turned back in substantially a V-shape on the silicon substrate,
the optical waveguide coupler is formed at a first end of the waveguide,
the V-shaped groove is formed to be coupled to the optical waveguide coupler,
the optical fiber is mounted on the V-shaped groove to transmit and receive light between itself and the optical waveguide coupler,
the LD is mounted opposite to the other end of the waveguide to transmit light to the waveguide,
the WDM filter is mounted on a turned area to allow light to pass therethrough or reflect light selectively, and
the PD is mounted opposite to the WDM filter to receive light selectively allowed to pass.

23. The sub-assembled unit according to claim 18, wherein the optical component comprises:
   an optical active device.

24. The sub-assembled unit according to claim 18, wherein the optical component comprises:
   an optical passive device.

25. The sub-assembled unit according to claim 23, wherein the optical active device comprises:
   an optical detecting element.

26. The sub-assembled unit according to claim 24, wherein the optical passive device comprises:
   a lens.

27. The sub-assembled unit according to claim 24, wherein the optical passive device comprises:
   a thin film filter.

28. An optical module with a waveguide and an optical component optically coupled, comprising:
   the sub-assembled optical unit according to claim 18;
   a control unit controlling light transmitted by the LD in the sub-assembled optical unit and processing light received by the PD;
   a package storing the sub-assembled optical unit and the control unit; and
   a group of terminals supplying electric power to the sub-assembled optical unit and the control unit and taking out electric signals from these units.

29. The optical module according to claim 28, further comprising:
   a ferrule storing the end of the optical fiber; and
   a flange for fixing the ferrule to the package.

30. An optical coupling method of optically coupling a waveguide and an optical component having mutually different spot sizes, the method comprising:
   converting a spot size of an optical signal of a long wavelength band into a larger size than that of an optical signal of a short wavelength band by a first spot size converting part; and
   converting a spot size of the optical signal of the short wavelength band into a larger size than that of the optical signal of the long wavelength band by a second spot size converting part,
   wherein the first spot size converting part converts the spot size of the optical signal of the long wavelength band into a larger size by narrowing the optical path width of the first spot size converting part in a direction toward the second spot size converting part.

31. The optical coupling method according to claim 30, wherein the spot size of an optical signal of a longest wavelength of wavelengths to be transmitted is converted into a largest size by the first spot size converting part; and
   the spot size of an optical signal of a shortest wavelength of wavelengths to be transmitted is converted into a largest size by the second spot size converting part.

32. The optical coupling method according to claim 30, wherein the second spot size converting part converts the spot size of the optical signal of the short wavelength by a diffraction effect of light.

33. The optical coupling method according to claim 32, wherein the diffraction effect of light is achieved by segmenting the waveguide.

34. The optical coupling method according to claim 30, wherein the short wavelength band includes a band of equal to or less than 1.3 μm.

35. The optical coupling method according to claim 30, wherein the short wavelength band includes a band of equal to or less than 1.5 μm.

36. An optical coupling system for optically coupling a waveguide and an optical component having mutually different spot sizes, the system comprising:
   means for converting a spot size of an optical signal of a long wavelength band into a larger size than that of an optical signal of a short wavelength band; and
   means for converting a spot size of the optical signal of the short wavelength band into a larger size than that of the optical signal of the long wavelength band.

37. An optical waveguide coupler for optically coupling an optical waveguide and an optical component having mutually different spot sizes, comprising:
   a first spot size converting part, which converts a spot size with higher efficiency for an optical signal of a long wavelength band than for an optical signal of a short wavelength band; and
   a second spot size converting part, which converts a spot size with higher efficiency for the optical signal of the short wavelength band than for the optical signal of the long wavelength band,
   wherein a waveguide width of the first spot size converting part is narrowed in a direction toward the second spot size converting part side, and
   a waveguide width Wb of an edge of the first spot size converting part on the second spot size converting part side satisfies the following expression:

$$Ws = R \times Wb \quad 1.0 \leq R \leq 1.5$$

where Ws is a waveguide width of the second spot size converting part.

38. The optical waveguide coupler according to claim 37, wherein the first spot size converting part converts into a largest size a spot size of an optical signal of a longest wavelength of wavelengths to be transmitted, and the second spot size converting part converts into a largest size a spot size of an optical signal of a shortest wavelength of wavelengths to be transmitted.

39. The optical waveguide coupler according to claim 37, wherein the first spot size converting part comprises:
   a tapered waveguide with the waveguide width changed.

40. The optical waveguide coupler according to claim 37, wherein the second spot size converting part comprises:
   a periodically segmented waveguide segmented along a direction in which light is propagated.

* * * * *